(12) United States Patent
Sakai

(10) Patent No.: US 9,575,398 B2
(45) Date of Patent: Feb. 21, 2017

(54) PROJECTOR

(71) Applicant: SEIKO EPSON CORPORATION, Tokyo (JP)

(72) Inventor: Yohei Sakai, Suwa (JP)

(73) Assignee: Seiko Epson Corporation, Tokyo (JP)

(*) Notice: Subject to any disclaimer, the term of this patent is extended or adjusted under 35 U.S.C. 154(b) by 69 days.

(21) Appl. No.: 14/660,223

(22) Filed: Mar. 17, 2015

(65) Prior Publication Data

US 2015/0268539 A1 Sep. 24, 2015

(30) Foreign Application Priority Data

Mar. 20, 2014 (JP) ................. 2014-058774

(51) Int. Cl.
G03B 21/14 (2006.01)

(52) U.S. Cl.
CPC ........... *G03B 21/142* (2013.01); *G03B 21/145* (2013.01)

(58) Field of Classification Search
CPC ....... G03B 21/142; G03B 21/145; G03B 5/00; G03B 5/05
See application file for complete search history.

(56) References Cited

U.S. PATENT DOCUMENTS

| | | | |
|---|---|---|---|
| 2002/0093629 A1* | 7/2002 | Watanabe | H04N 9/3105 353/101 |
| 2002/0112543 A1* | 8/2002 | Noguchi | G03B 5/00 73/618 |
| 2002/0154278 A1* | 10/2002 | Masuda | G02B 7/02 353/101 |
| 2009/0185145 A1 | 7/2009 | Kitahara et al. | |
| 2009/0219505 A1 | 9/2009 | Kitahara et al. | |
| 2012/0086821 A1* | 4/2012 | Yasutomi | G02B 7/08 348/208.4 |

FOREIGN PATENT DOCUMENTS

| | | |
|---|---|---|
| JP | 2009-175351 | 8/2009 |
| JP | 2009-175352 | 8/2009 |
| JP | 2009-175353 | 8/2009 |
| JP | 2009-175354 | 8/2009 |

* cited by examiner

*Primary Examiner* — Sultan Chowdhury
(74) *Attorney, Agent, or Firm* — Workman Nydegger

(57) ABSTRACT

A projector includes a projection optical apparatus that projects an image and a projection position adjustment apparatus that moves the projection optical apparatus in orthogonal directions orthogonal to a central axis of the projection optical apparatus. The projection position adjustment apparatus includes a first movable member that supports the projection optical apparatus, a support member that supports the first movable member movably in the orthogonal directions, and a first transmission unit that moves in the orthogonal directions with the first transmission unit engaging with the first movable member to move the first movable member in the orthogonal directions. The first transmission unit is disposed in a position where the first transmission unit overlaps with part of the first movable member when the projection position adjustment apparatus is viewed along the central axis of the projection optical apparatus.

4 Claims, 19 Drawing Sheets

PROJECTOR

BACKGROUND

1. Technical Field

The present invention relates to a projector.

2. Related Art

There is a known projector including a light source apparatus, a light modulation apparatus that modulates light outputted from the light source apparatus to form an image according to image information, and a projection optical apparatus that enlarges and projects the formed image on a screen or any other projection receiving surface. As a projector of this type, there is a known projector including a projection position adjustment apparatus that moves the projection optical apparatus in the upward/downward direction and the rightward/leftward direction orthogonal to the central axis of the projection optical apparatus to adjust the position where the image is projected (see JP-A-2009-175352, for example).

The projection position adjustment apparatus provided in the projector described in JP-A-2009-175352 includes a lens connection section, a first movable plate to which the lens connection section is fixed, a second movable plate, a fixing member, first and second adjustment drivers, and four linkage members.

The lens connection section is connected to a projection lens that forms the projection optical apparatus and fixed to the first movable plate. The first movable plate is configured to be movable along the fixing member in the upward/downward direction and the rightward/leftward direction. The second movable plate is configured to be movable in the rightward/leftward direction between the first movable plate and the fixing member and moves the first movable plate, when the second movable plate moves in the rightward/leftward direction, in the same direction. The fixing member is fixed in the projector and supports the entire projection position adjustment apparatus. The first adjustment driver moves the first movable plate in the upward/downward direction in response to user's operation, and the second adjustment driver moves the second movable plate in the rightward/leftward direction in response to user's operation, whereby the position where the image is projected is changed in the upward/downward direction and the rightward/leftward direction. The linkage members, which are inserted through the fixing member, attach the first movable plate to the fixing member.

In recent years, an electronic apparatus is desired to be compact in size, and a projector is also required to be compact in size. In particular, a projector is not only used after installed where it is used but also used after carried to the location where it is used.

It has been therefore desired to provide a configuration that allows a projector to be more compact.

SUMMARY

An advantage of some aspects of the invention is to provide a projector that can be compact in size.

A projector according to an aspect of the invention includes a projection optical apparatus that projects an image and a movement apparatus that moves the projection optical apparatus in orthogonal directions orthogonal to a central axis of the projection optical apparatus. The movement apparatus includes a movable member that supports the projection optical apparatus, a support member that supports the movable member movably in the orthogonal directions, and a drive mechanism that moves in the orthogonal directions with the drive mechanism engaging with the movable member to move the movable member in the orthogonal directions. The drive mechanism is disposed in a position where the drive mechanism overlaps with part of the movable member when the movement apparatus is viewed along the central axis of the projection optical apparatus.

According to the aspect described above, the drive mechanism, which moves the movable member in the orthogonal direction orthogonal to the central axis of the projection optical apparatus, is located in a position where the drive mechanism overlaps with the movable member when viewed along the central axis of the projection optical apparatus. Therefore, since the drive mechanism is not located on the side facing a side surface of the movable member, that is, outside the movable member away from the projection optical apparatus when viewed along the central axis described above, the dimension of the movement apparatus along the radial direction of the projection optical apparatus can be reduced. As a result, the size of the movement apparatus and hence the size of the projector can be reduced.

In the aspect described above, it is preferable that the drive mechanism is located on the opposite side of the movement apparatus to the support member.

According to the aspect with the configuration described above, since the distance between the movable member and the drive mechanism is shortened, the movable member and the drive mechanism are allowed to engage with each other with precision, and the movable member can therefore be moved with precision.

Since the projection optical apparatus is held by the movable member, the projection optical apparatus is smaller than the movable member. Therefore, when the movement apparatus is viewed along the central axis described above, a space is created between the outer edge of the movable member and the outer edge of the projection optical apparatus.

In this situation, since the drive mechanism can be disposed in the space in the aspect with the configuration described above, a space in which the drive mechanism is disposed does not need to be provided outside the movable member, whereby the size of the movement apparatus can be definitely reduced. The size of the projector can therefore be reduced.

In the aspect described above, it is preferable that the movable member includes a first movable member that holds the projection optical apparatus and moves in a first direction of the orthogonal directions and a second movable member that is disposed between the first movable member and the support member and moves along with the first movable member in a second direction of the orthogonal directions that is orthogonal to the first direction, and the drive mechanism is located in a position shifted from the position where the first movable member holds the projection optical apparatus toward the side where the projection optical apparatus projects the image.

According to the aspect with the configuration described above, the first movable member, which holds the projection optical apparatus and moves in the first direction, is moved by the second movable member, in the first direction. The projection optical apparatus can thus be moved both in the first and second directions described above. The range over which the projection optical apparatus moves can therefore be increased.

Further, the first movable member is located in a position shifted from the second movable member toward the side where the image is projected. Since the drive mechanism is located in a position shifted from the position where the first movable member holds the projection optical apparatus toward the side where the image is projected, the drive mechanism can be reliably disposed in the space described above. The size of the projector can therefore be definitely reduced.

In the aspect described above, it is preferable that the drive mechanism has a screw gear having a spiral groove formed on an outer circumference thereof and rotating around an axis along one of the orthogonal directions and a slidable member that meshes with the screw gear and moves in the one of the orthogonal directions, and the slidable member is located in a position shifted from the first movable member toward the side where the image is projected and moves the first movable member when the slidable member moves.

According to the aspect with the configuration described above, since the drive mechanism has a simple configuration formed of the screw gear and the slidable member, the first movable member can be reliably moved in the orthogonal direction described above.

In the aspect described above, it is preferable that the projector further includes an operation portion on which rotating operation that moves the drive mechanism is performed, at least one gear that transmits a rotational force produced by the operation portion to the drive mechanism, and a plate-shaped member that has one surface that rotatably supports the operation portion, has another surface that rotatably supports the at least one gear, and is attached to the support member, and the drive mechanism is disposed on the another surface.

The operation portion can be a dial byway of example.

According to the aspect with the configuration described above, the rotational force produced by the operated and rotated operation portion is transmitted via the at least one gear to the drive mechanism, and the drive mechanism moves the movable member. As a result, the movable member and hence the projection optical apparatus can be moved only by rotating the operation portion.

Further, the at least one gear is supported by the plate-shaped member, and the drive mechanism is disposed on the another surface of the plate-shaped member, which is attached to the support member. The drive mechanism can therefore be reliably disposed in a position where it overlaps with part of the movable member when the movement apparatus is viewed along the central axis described above.

In addition, since the operation portion is rotatably supported by the one surface of the plate-shaped member that faces away from the another surface, the operation portion can be readily operated and rotated.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
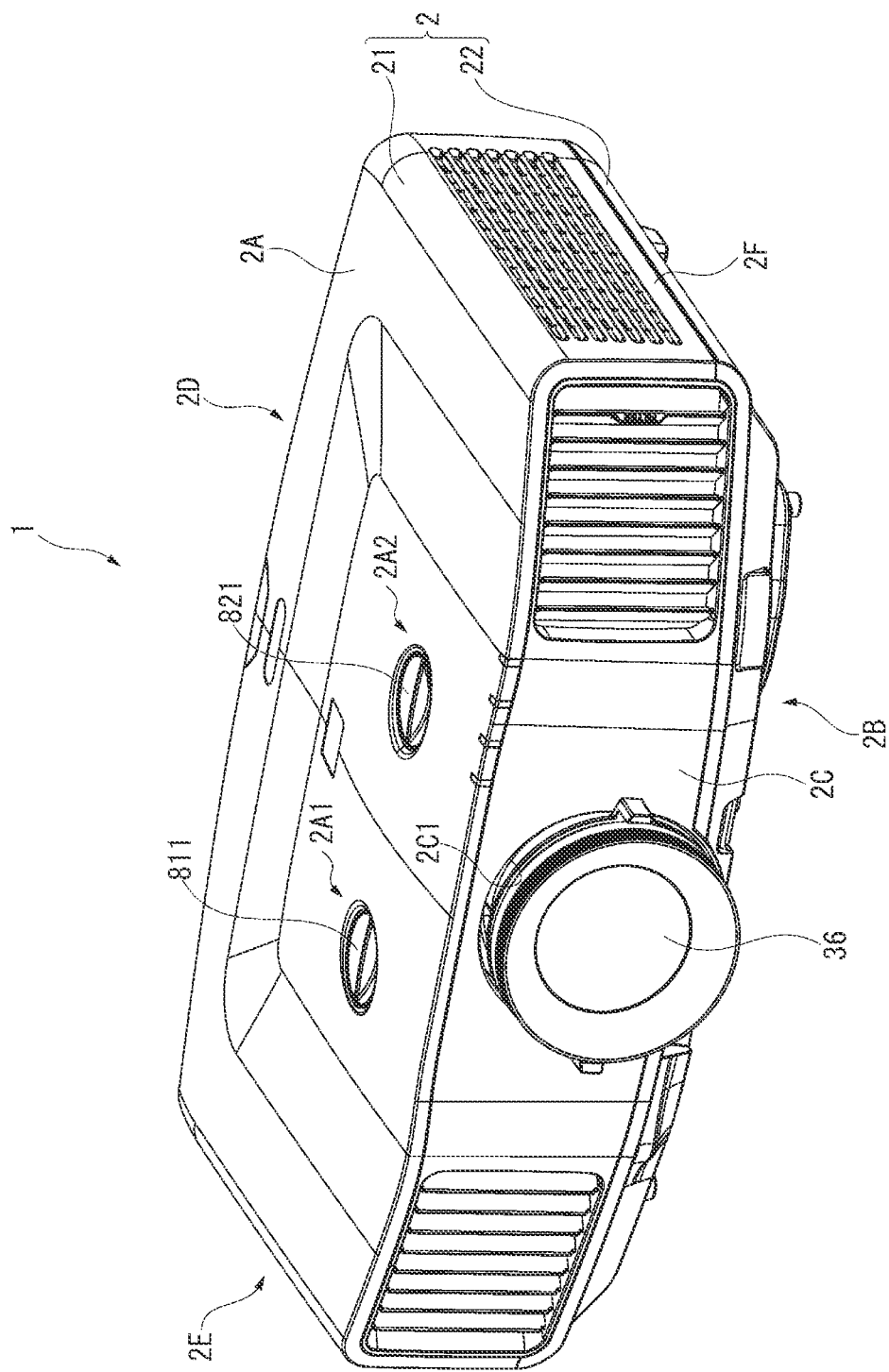
FIG. 1 is a perspective view showing the exterior appearance of a projector according to an embodiment of the invention.

An embodiment of the invention will be described below in detail with reference to the drawings.
Exterior Configuration of Projector FIG. 1 is a perspective view showing the exterior appearance of a projector 1 according to the present embodiment. Specifically, FIG. 1 is a perspective view of the projector 1 installed, for example, on an installation stand and viewed obliquely upward from the front.

The projector 1 according to the present embodiment modulates alight flux emitted from a light source in accordance with image information to form image light and enlarges and projects the formed image light on a screen or any other projection receiving surface (not shown). The projector 1 includes an exterior enclosure 2, which forms the exterior of the projector 1, as shown in FIG. 1.

The exterior enclosure 2 is an enclosure made of a metal or a synthetic resin and accommodates an apparatus body 10 (see FIG. 2) of the projector 1. The exterior enclosure 2 is a combination of an upper case 21 and a lower case 22. The upper case 21 forms a top portion 2A and part of a front portion 2C, a rear portion 2D, and left and right side portions 2E, 2F of the exterior enclosure 2, and the lower case 22 forms a bottom portion 2B and part of the front portion 2C, the rear portion 2D, and the left and right side portions 2E, 2F of the exterior enclosure 2.

The front portion 2C has an opening 2C1, which exposes part of a projection optical apparatus 36, which will be described later.

The top portion 2A has openings 2A1 and 2A2, which expose a first dial 811 and a second dial 821, which form a projection position adjustment apparatus 4, which will be described later. When a user operates and rotates the dials 811 and 821, the projection optical apparatus 36 moves in the upward/downward direction (direction along which top portion 2A and bottom portion 2B face each other) and the rightward/leftward direction (direction along which left portion 2E and right portion 2F face each other), whereby the position of an image projected on the projection receiving surface is adjusted. The structure of the thus functioning projection position adjustment apparatus 4 will be described later in detail.

Internal Configuration

Figure 2:
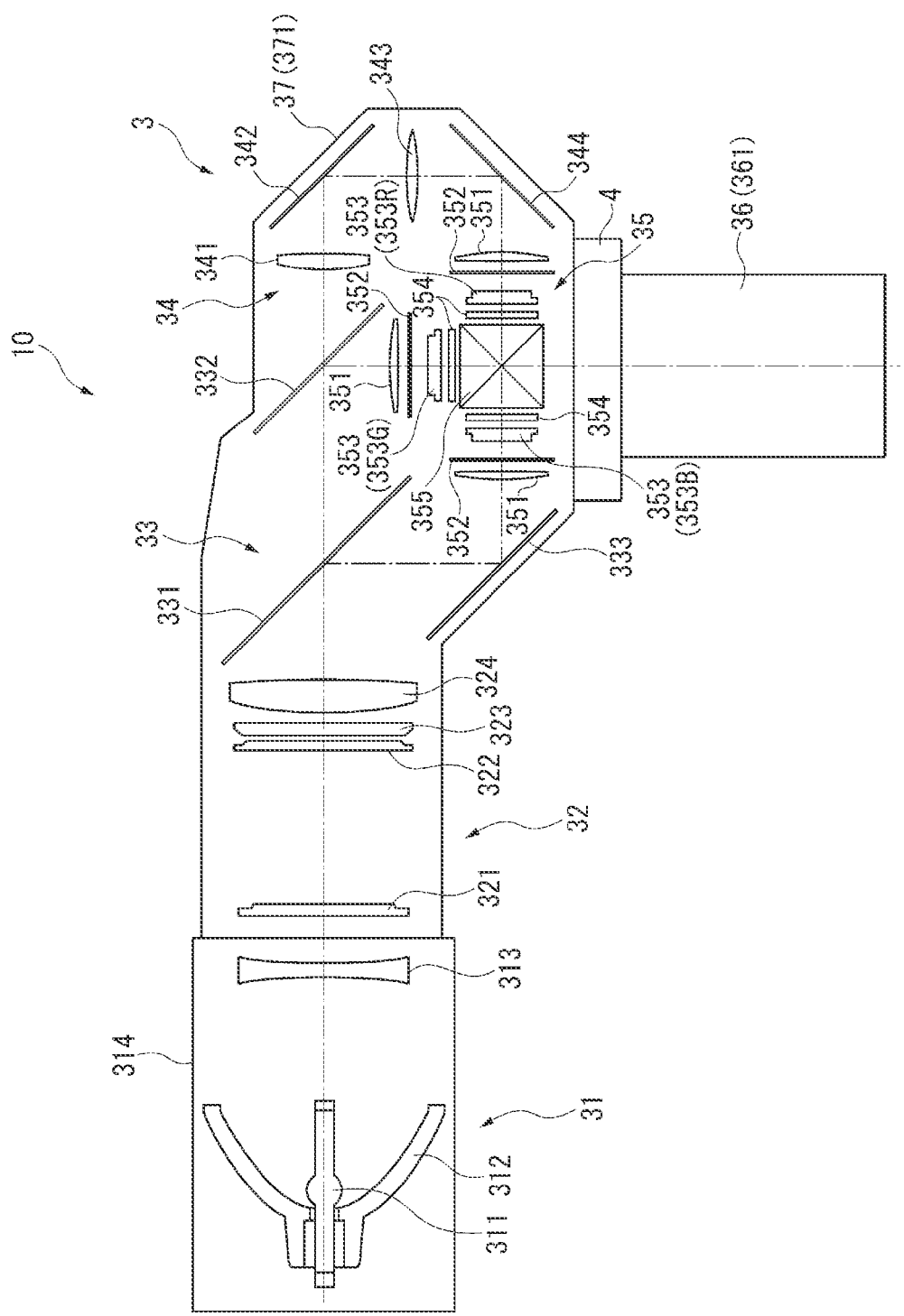
FIG. 2 diagrammatically shows an apparatus body in the embodiment.

FIG. 2 diagrammatically shows the apparatus body 10 accommodated in the exterior enclosure 2.

The apparatus body 10 includes an optical unit 3 and the projection position adjustment apparatus 4, as shown in FIG. 2. Although not shown, the apparatus body 10 includes a cooler that cools objects to be cooled in the projector 1, a power source that supplies the components of the projector 1 with electric power, and a controller that controls the operation of the projector 1.

Configuration of Optical Unit

The optical unit 3 forms and projects an image according to image information inputted from the controller described above. The optical unit 3 includes a light source apparatus 31, an illumination optical apparatus 32, a color separation apparatus 33, a relay apparatus 34, an electro-optical apparatus 35, the projection optical apparatus 36, and an optical part enclosure 37.

The light source apparatus 31 includes alight source lamp 311, such as an ultrahigh-pressure mercury lamp, a reflector 312, a parallelizing lens 313, and a housing 314, which accommodates the components described above.

The illumination optical apparatus 32 homogenizes the illuminance in a plane orthogonal to the central axis of light incident from the light source apparatus 31. The illumination optical apparatus 32 includes a first lens array 321, a second lens array 322, a polarization conversion element 323, and a superimposing lens 324.

The first lens array 321 divides a light flux incident thereon into a plurality of sub-light fluxes, and the second lens array 322, along with the superimposing lens 324, superimposes the plurality of sub-light fluxes incident from the first lens array 321 on one another on liquid crystal panels 353, which will be described later.

The polarization conversion element 323 aligns the polarization directions of light incident thereon with one another into a single polarization direction.

The color separation apparatus 33 includes two dichroic mirrors 331 and 332 and a reflection mirror 333 and separates the light incident from the illumination optical apparatus 32 into three color light fluxes, red (R), green (G), and blue (B) light fluxes.

The relay apparatus 34 includes a light-incident-side lens 341, a relay lens 343, and reflection mirrors 342 and 344 and has a function of guiding the separated red light from the color separation apparatus 33 to a field lens 351 for red light.

The electro-optical apparatus 35 modulates the color light fluxes incident thereon to form an image according to the image information inputted from the controller described above. The electro-optical apparatus 35 includes field lenses 351, light-incident-side polarizers 352, liquid crystal panels 353 (reference characters 353R, 353G, and 353B denote liquid crystal panels for red, green, and blue) as the light modulation apparatus, light-exiting-side polarizers 354, and a single light combining apparatus 355, and the components 351 to 354 are provided in correspondence with the color light fluxes described above.

Among them, the light combining apparatus 355 in the present embodiment is a cross dichroic prism formed by bonding four rectangular prisms to each other and hence having a substantially square shape in a plan view. In the light combining apparatus 355, two dielectric multilayer films formed on the interfaces between the rectangular prisms combine the color light fluxes modulated by the corresponding liquid crystal panels 353 with one another. The combined light (image forming light) from the thus configured light combining apparatus 355 is incident on the projection optical apparatus 36.

The projection optical apparatus 36 has a front end portion exposed through the opening 2C1 (see FIG. 1), which is formed through the front portion 2C of the exterior enclosure 2 described above, and enlarges and projects the combined light from the light combining apparatus 355, whereby an image is projected on the projection receiving surface described above. The thus functioning projection optical apparatus 36 is configured as a combination lens having a lens group including a zoom lens and a focus lens accommodated in a lens barrel 361.

The optical part enclosure 37 is a combination of a part accommodating member 371 and a lid member (not shown), each of which is made of a synthetic resin or a metal.

The part accommodating member 371 accommodates the apparatus 31 to 34 described above and the field lenses 351 and the light-incident-side polarizers 352 in the electro-optical apparatus 35. An opening (not shown) through which the optical parts described above are accommodated in the part accommodating member 371 is blocked with the lid member.

Configuration of Projection Position Adjustment Apparatus

Figure 3:
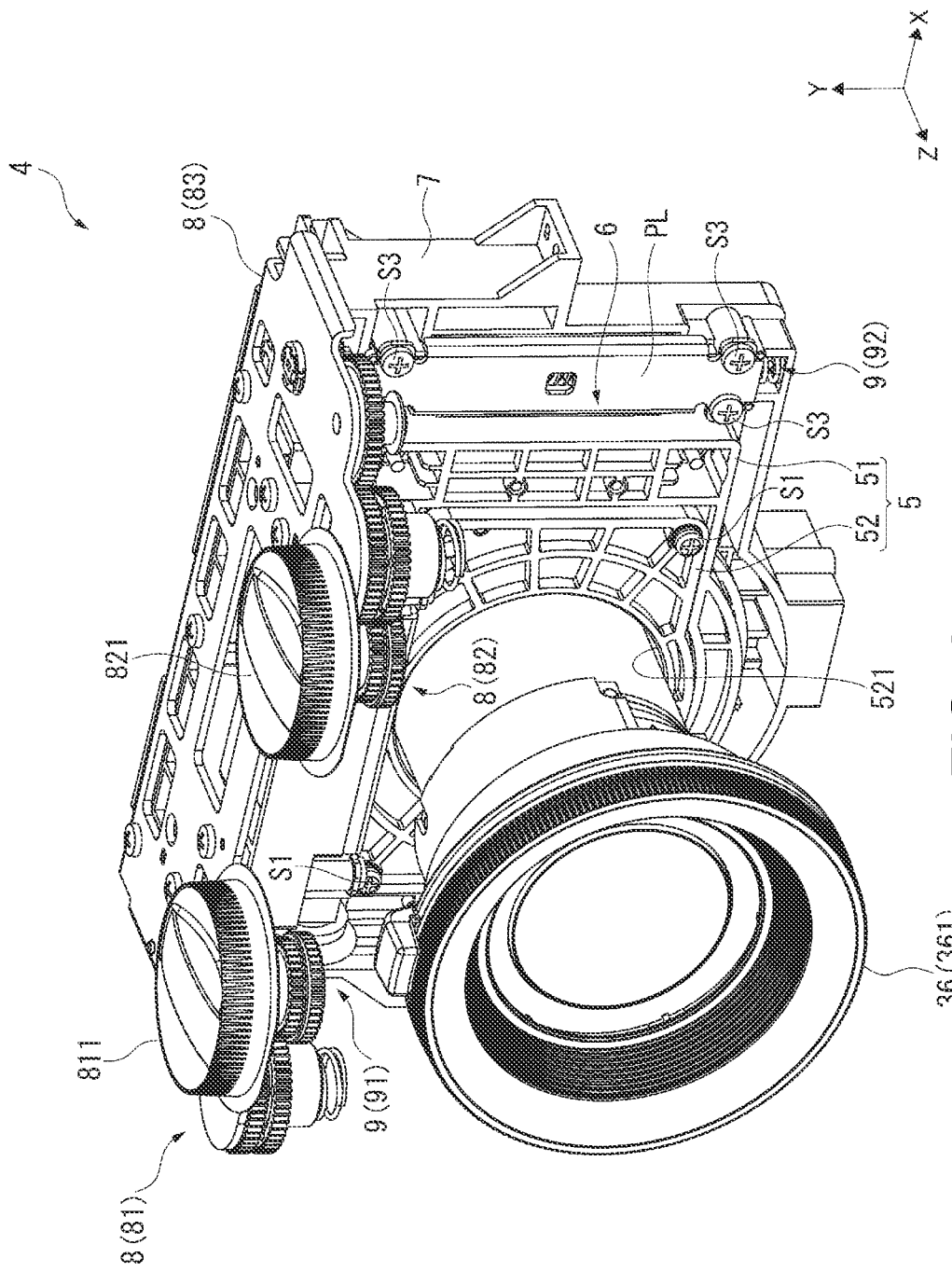
FIG. 3 is a perspective view of a projection position adjustment apparatus in the embodiment viewed from the light exiting side.
Figure 4:
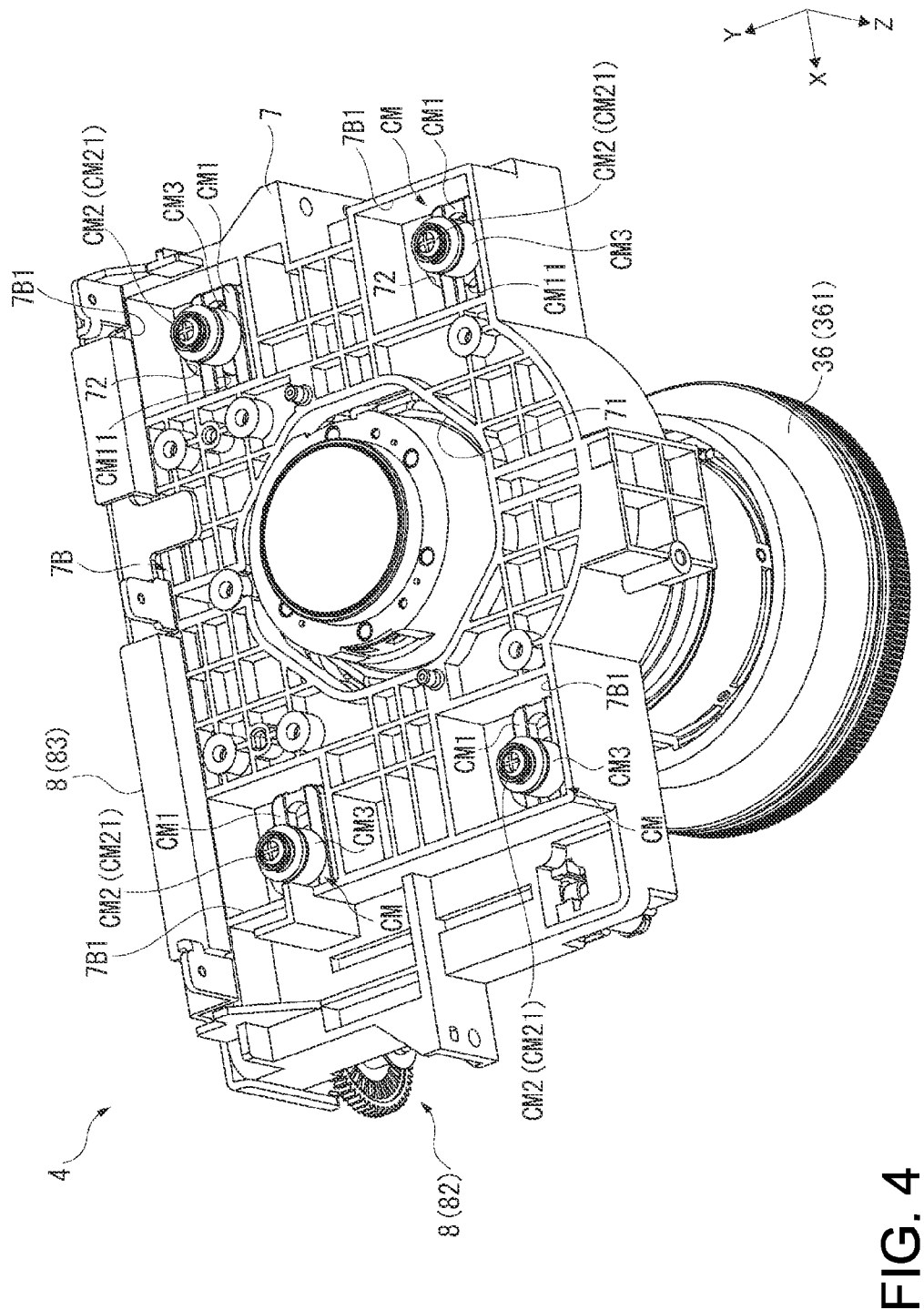
FIG. 4 is a perspective view of the projection position adjustment apparatus in the embodiment viewed from the light incident side.
Figure 5:
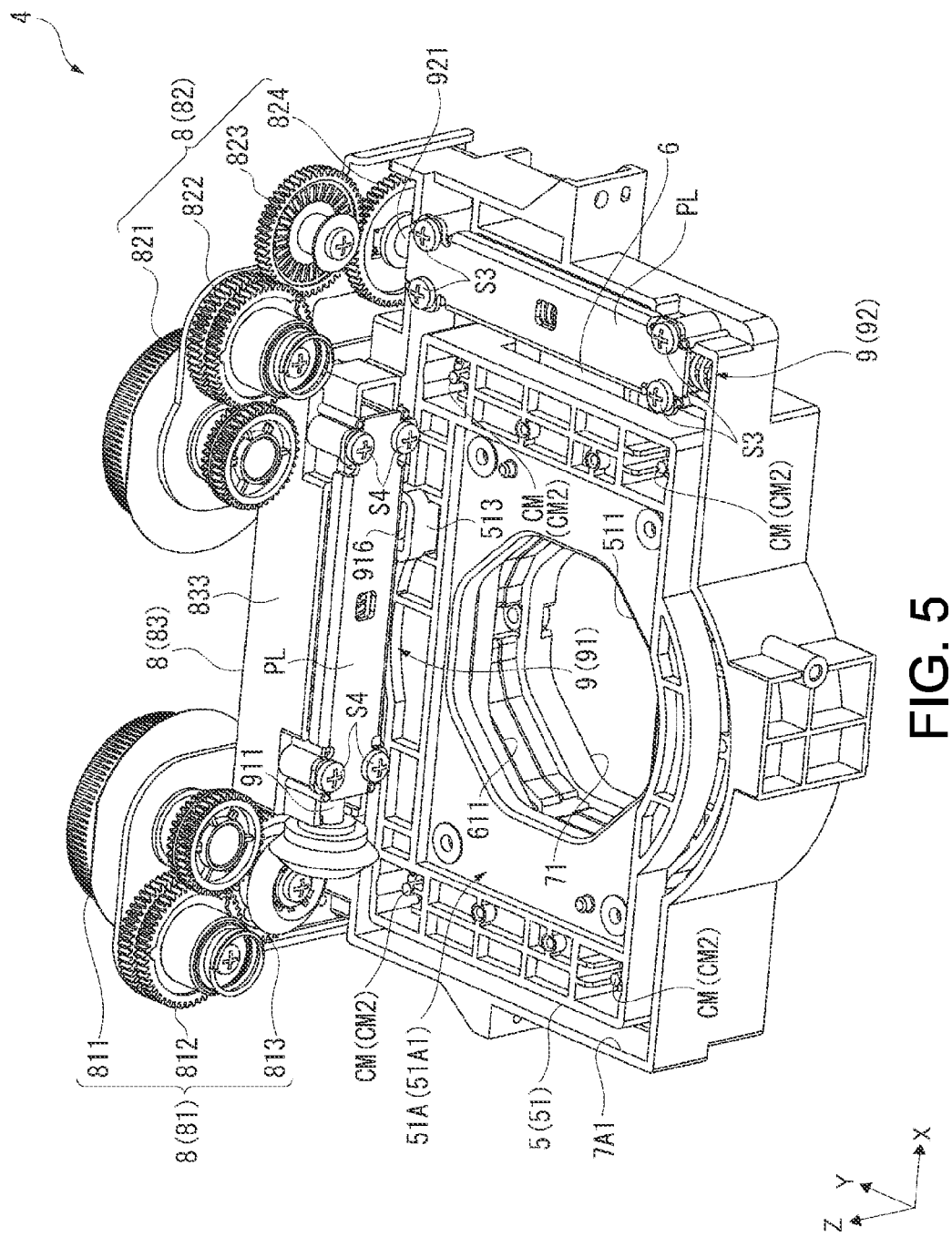
FIG. 5 is a perspective view of the projection position adjustment apparatus in the embodiment viewed from the light exiting side.
Figure 6:
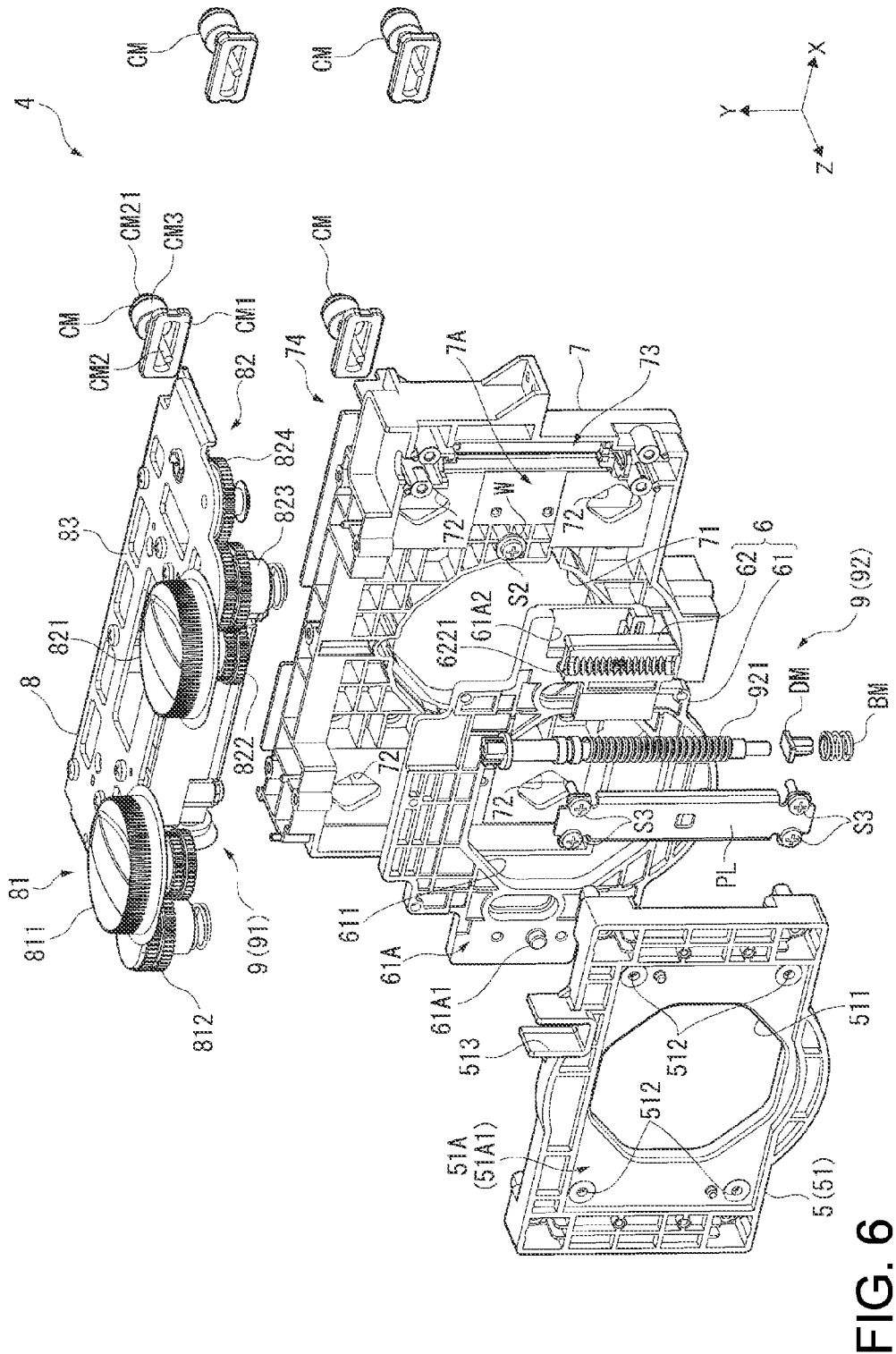
FIG. 6 is an exploded perspective view showing the projection position adjustment apparatus in the embodiment.

FIGS. 3 and 4 are perspective views of the projection optical apparatus 36 and the projection position adjustment apparatus 4 viewed from the light exiting side and the light incident side, respectively. FIG. 5 is a perspective view of the projection position adjustment apparatus 4 viewed from the light exiting side. FIG. 6 is an exploded perspective view showing the projection position adjustment apparatus 4.

In the following description, it is assumed that a Z direction is the direction in which the light incident on the projection optical apparatus 36 travels (traveling direction along the central axis of the light), and that X and Y directions are directions orthogonal not only to the Z direction but also to each other. In the present embodiment, when the projector 1 is installed on a predetermined installation surface and the Z direction extends along the horizontal direction, the Y direction is the direction oriented from below to above along the vertical direction (direction from bottom portion 2B toward top portion 2A), and the X direction is the direction from right to left along the horizontal direction when viewed along the Z direction (direction from left side portion 2E toward right side portion 2F). Further, a Z-direction side refers to the downstream side in the Z direction (Z-direction front side), and the side opposite to the Z direction refers to the upstream side in the Z direction (Z-direction base side). The same holds true for the other directions.

The projection position adjustment apparatus 4, which corresponds to a movement apparatus according to an embodiment of the invention, holds the lens barrel 361 in the projection optical apparatus 36 and moves the lens barrel 361 along the X and Y directions, which are orthogonal directions orthogonal to the central axis of the projection optical apparatus 36, to adjust the position where an image is projected. As shown in FIGS. 3 to 6, the projection position adjustment apparatus 4 includes a first movable member 5 (FIGS. 3, 5, and 6), a second movable member 6 (FIGS. 3 and 6), a support member 7 (FIGS. 3 to 6), a drive apparatus 8 (FIGS. 3, 5, and 6), a transmission apparatus 9, and four linkage members CM (FIGS. 4 and 6). The drive apparatus 8 and the transmission apparatus 9 are attached to the support member 7, and the first movable member 5 and the second movable member 6 are further attached to the support member 7 by using the linkage members CM. The projection position adjustment apparatus 4 is thus assembled.

Configuration of First Movable Member

The first movable member 5 is attached to the support member 7 movably along the X direction. The first movable member 5 includes a body portion 51, which grabs the projection optical apparatus 36, and a connection portion 52.

The connection portion 52 is a member connected to the lens barrel 361 in the projection optical apparatus 36 and located on the Z-direction side of the body portion 51. The connection portion 52 has an insertion hole 521 located substantially at the center thereof and having a substantially circular shape that conforms to the lens barrel 361, as shown in FIG. 3. The connection portion 52 is fixed to a Z-direction-side end surface 51A of the body portion 51 with screws S1 in four positions around the insertion hole 521 in a state in which the lens barrel 361 is inserted through the insertion hole 521 and a flange portion (not shown) of the lens barrel 361 that protrudes outward in the radial direction thereof is sandwiched between the body portion 51 and the connection portion 52.

Figure 7:
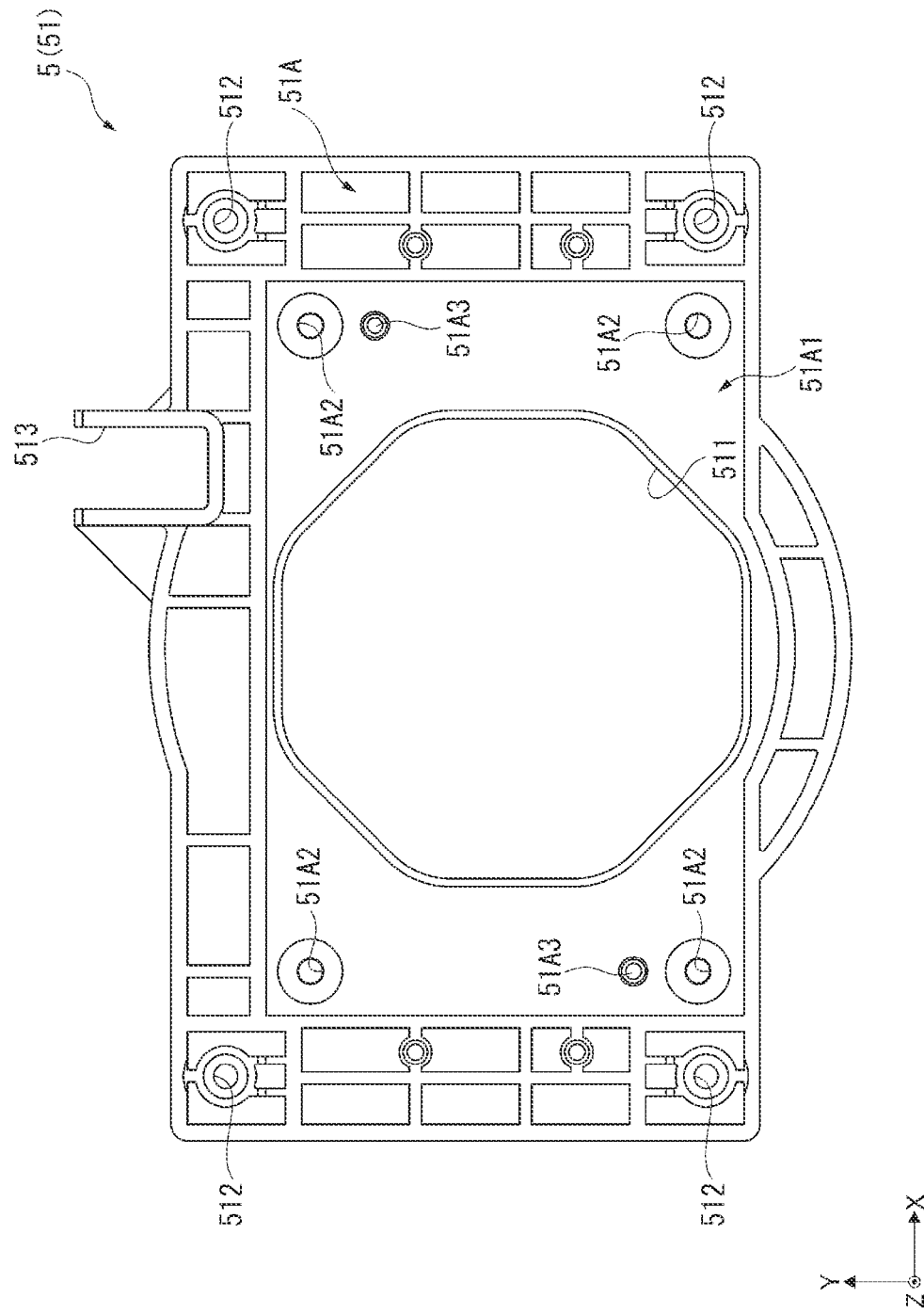
FIG. 7 shows a body portion of a first movable member in the embodiment viewed from the light exiting side.

FIG. 7 shows the body portion 51 viewed from the light exiting side (Z-direction side).

The body portion 51, along with the connection portion 52, holds the lens barrel 361 as described above and is supported by the support member 7 movably in the X and Y directions with an end surface 51B (see FIG. 8) of the body portion 51 on the side opposite to the Z direction being in contact with the support member 7.

The body portion 51 has a substantially rectangular shape when viewed along the Z direction, and an insertion hole 511, through which the lens barrel 361 is inserted, is formed in a substantially central portion of the body portion 51, as shown in FIG. 7.

Holes 512 are formed at the four corners of the body portion 51, and screw pins CM2 of the linkage members CM, which will be described later, are screwed into the holes 512 from the side opposite to the Z direction.

A recess 513 having a substantially U-like shape is formed at the Y-direction-side end of the body portion 51, and a slidable member 916 in the transmission apparatus 9, which will be described later, is inserted into the recess 513.

The Z-direction-side end surface 51A of the body portion 51 has a flat surface portion 51A1, which has a substantially rectangular shape, formed around the insertion hole 511 as shown in FIG. 7, and the connection portion 52 described above is attached to the flat surface portion 51A1. Threaded holes 51A2, into which the screws S1 described above are screwed, are formed at the four corners of the flat surface portion 51A1. Protrusions 51A3 are provided on the flat surface portion 51A1 and on opposite sides of the insertion hole 511, and the protrusions 51A3 are used to position the lens barrel 361.

Figure 8:
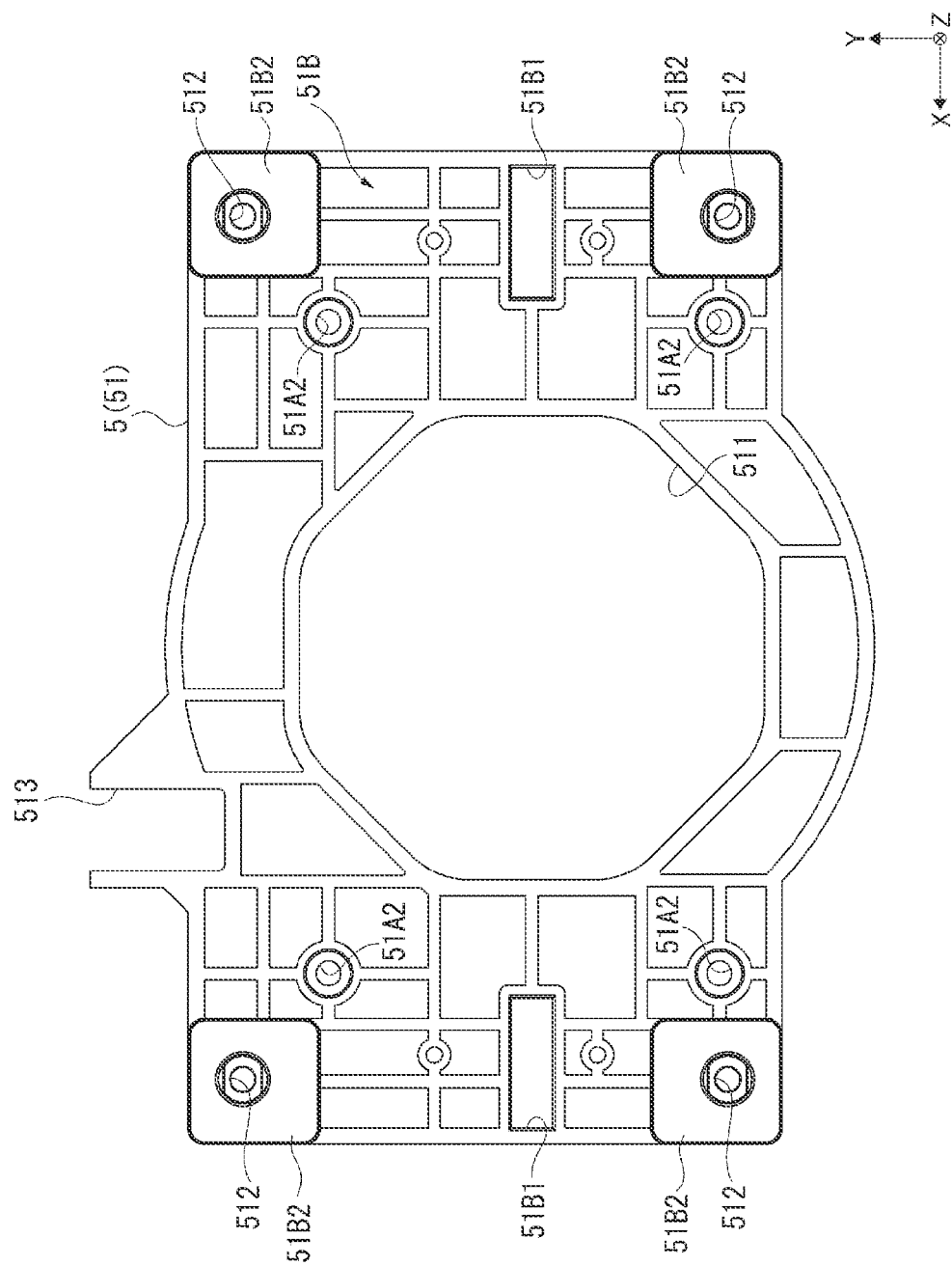
FIG. 8 shows the body portion of the first movable member in the embodiment viewed from the light incident side.

FIG. 8 shows the body portion 51 viewed from the light incident side (side opposite to Z direction).

Guide recesses 51B1, which are recessed toward the Z-direction side, are formed in the end surface 51B of the body portion 51, which is the end surface on the side opposite to the Z direction, and on opposite sides of the insertion hole 511, as shown in FIG. 8. Each of the guide recesses 51B1 has a substantially rectangular shape elongated in the X direction, and guide protrusions 61A1 (see FIGS. 9 and 10), which are provided on a Z-direction-side end surface 61A of the second movable member 6, are inserted into the guide recesses 51B1.

Further, the end surface 51B has flat surface portions 51B2, each of which has a substantially rectangular shape, formed around the holes 512. The flat surface portions 51B2 come into contact with flat surface portions 7A4 (see FIG. 12) of the support member 7, which will be described later, when the first movable member 5 is attached to the support member 7.

Configuration of Second Movable Member

Figure 9:
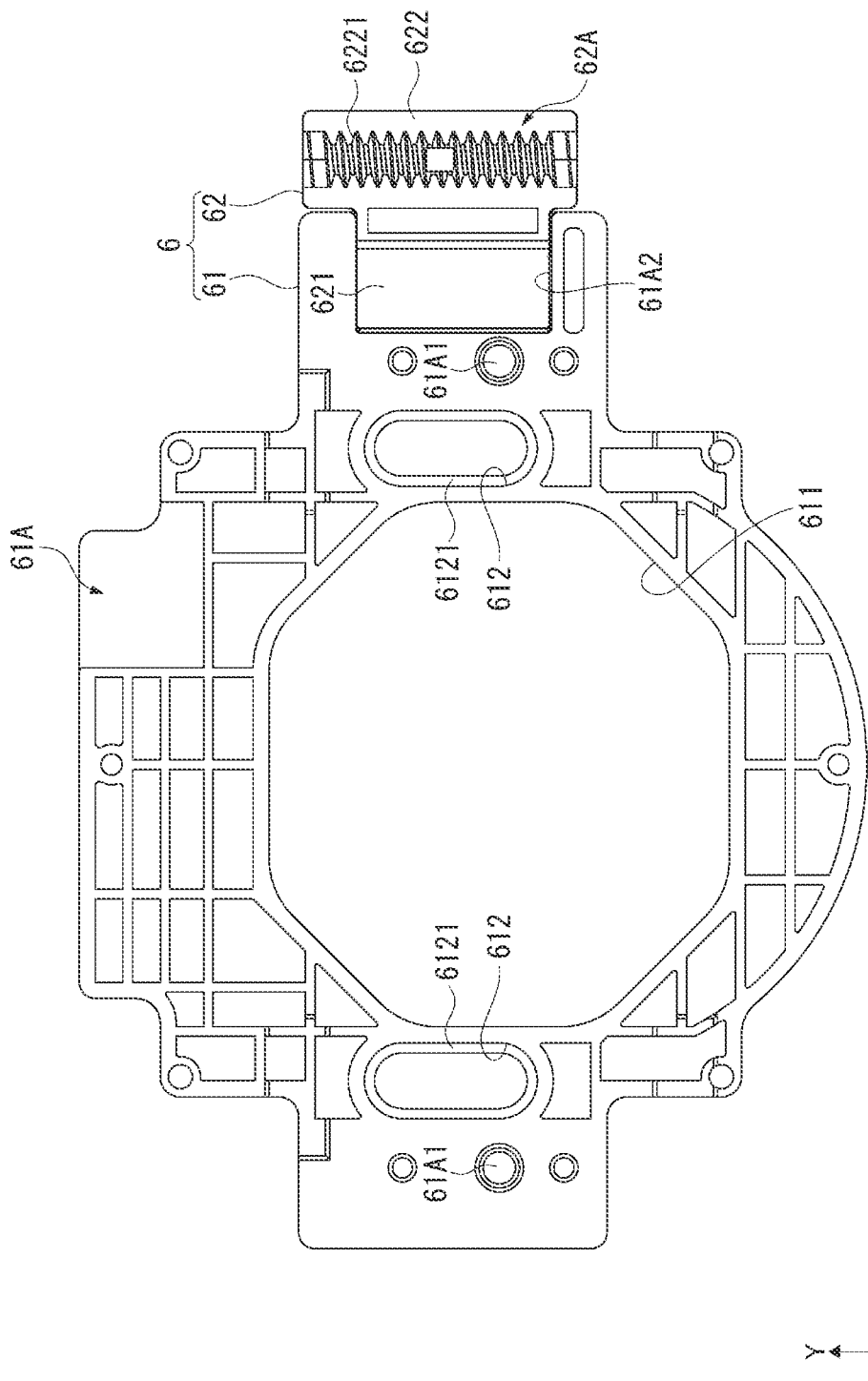
FIG. 9 shows a second movable member in the embodiment viewed from the light exiting side.
Figure 10:
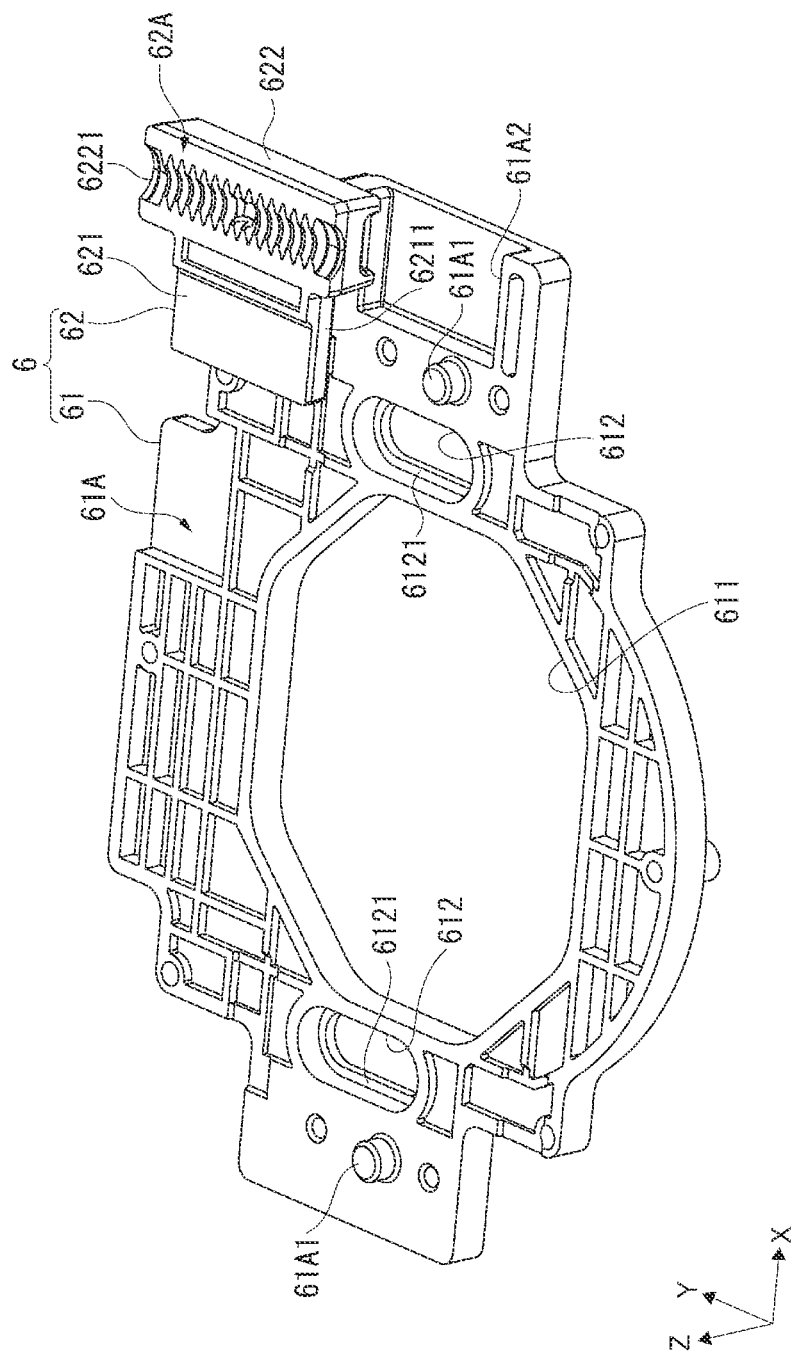
FIG. 10 is an exploded perspective view showing the second movable member in the embodiment.

FIGS. 9 and 10 show the second movable member 6 viewed from the light exiting side (Z-direction side). In particular, FIG. 10 is an exploded perspective view showing the second movable member 6.

The second movable member 6 is sandwiched between the first movable member 5 (body portion 51) and the support member 7 and has a function of moving the first movable member 5 in the Y direction. The second movable member 6 includes a body portion 61 and an engaging member 62, which is attached to the body portion 61, as shown in FIGS. 9 and 10.

The body portion 61 is formed of a plate-shaped part having a substantially cross-like shape in a plan view, and an insertion hole 611, through which the lens barrel 361 is inserted, is formed in a substantially central portion of the body portion 61.

Holes 612, each of which is a through hole having an elliptical shape with the major axis extending in the Y direction, are formed in the body portion 61 on opposite sides of the insertion hole 611 in the X direction. In each of the holes 612 is formed a stepped portion 6121, the opening area of which decreases with distance from the Z-direction-side end toward the end on the side opposite to the Z direction. Further, in each of the holes 612 are placed a washer W (see FIG. 6) disposed on the support member 7 and a screw S2 (see FIG. 6), which fixes the washer W, when the second movable member 6 is placed on the support member 7, which will be described later. The washers W come into contact with the Z-direction-side surfaces of the stepped portions 6121 when the second movable member 6 is moved to a limit in the Y direction or the direction opposite to the Y direction, whereby one Y-direction end of the second movable member 6 will not be inclined in the direction in which the second movable member 6 moves away from the support member 7.

The guide protrusions 61A1, each of which has a substantially cylindrical shape, are provided on the Z-direction-side end surface 61A of the body portion 61 and in positions outside the holes 612 (on X-direction side and side opposite to X direction) with respect to the insertion hole 611. The guide protrusions 61A1 are inserted into the corresponding guide recesses 51B1 described above. The guide protrusions and recesses guide movement of the body portion 51 relative to the second movable member 6 and hence movement of the first movable member 5 along the X direction but restrict movement of the first movable member 5 relative to the second movable member 6 in the Y direction.

An attachment portion 61A2, which has a substantially rectangular shape, is formed at an X-direction-side end portion of the end surface 61A. The attachment portion 61A2 is recessed toward the side opposite to the Z direction and the side opposite to the X direction, and the engaging member 62 is attached to the attachment portion 61A2.

The engaging member 62 is made of the same synthetic resin as that of the body portion 61 but is formed as a member separate from the body portion 61. The engaging member 62 has a substantially laterally-oriented T-like shape when viewed along the Z direction. The thus formed engaging member 62 has a fitting portion 621, which has a substantially rectangular shape and is inserted and fit into the attachment portion 61A2 described above in the direction opposite to the X direction, and a protruding portion 622, which protrudes from the body portion 61 in the X direction when the fitting portion 621 is fit into the attachment portion 61A2.

The engaging portion 621 has an inclined portion 6211, the Y-direction dimension of which increases from the end opposite to the X direction along the X direction, as shown in FIG. 10. The inclined portion 6211 allows the fitting portion 621 to be readily inserted into the attachment portion 61A2 and prevents the fitting portion 621 having been fit into the attachment portion 61A2 from falling off the attachment portion 61A2. Further, since the engaging portion 62 is configured as a member separate from the body portion 61, variation in the dimension each of the parts can be absorbed. As a result, the engagement between the guide protrusions 61A1 described above and the guide recesses 51B1 described above and engagement between a screw gear 921 (see FIG. 6), which forms a second transmission unit 92 of the transmission apparatus 9, which will be described later, and the engaging member 62 can be reliably achieved as compared with a case where the second movable member 6 is formed as an integrated molded part.

A meshing portion 6221, which has a plurality of semicircular threaded grooves, is formed in a Z-direction-side end surface 62A of the engaging member 62 and in the position of the protruding portion 622. The meshing portion 6221 meshes with the screw gear 921. The engaging member 62 moves along the thrust direction of the screw gear 921 when the screw gear 921 rotates, and the movement of the engaging member 62 moves the second movable member 6 along the Y direction. The movement of the second movable member 6 will be described later in detail.

Figure 11:
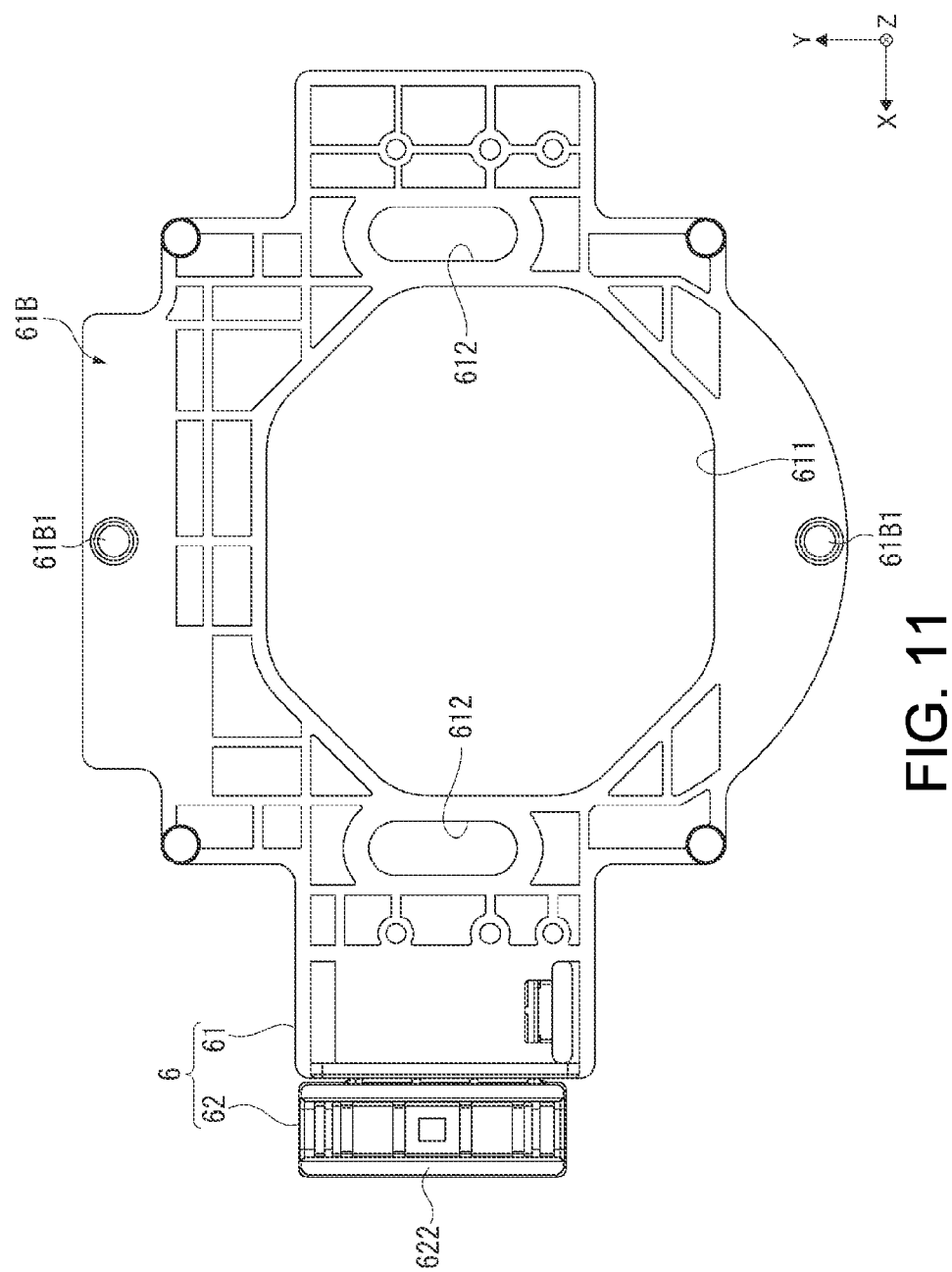
FIG. 11 shows the second movable member in the embodiment viewed from the light incident side.

FIG. 11 shows the second movable member 6 viewed from the light incident side (side opposite to Z direction).

Guide protrusions 61B1 are formed on an end surface 61B of the body portion 61 on the side opposite to the Z direction and on opposite sides of the insertion hole 611 in the Y direction, as shown in FIG. 11. The guide protrusions 61B1 are inserted into guide grooves 7A2 formed along the Y direction in the support member 7, which will be described later.

Structure of Support Member

Figure 12:
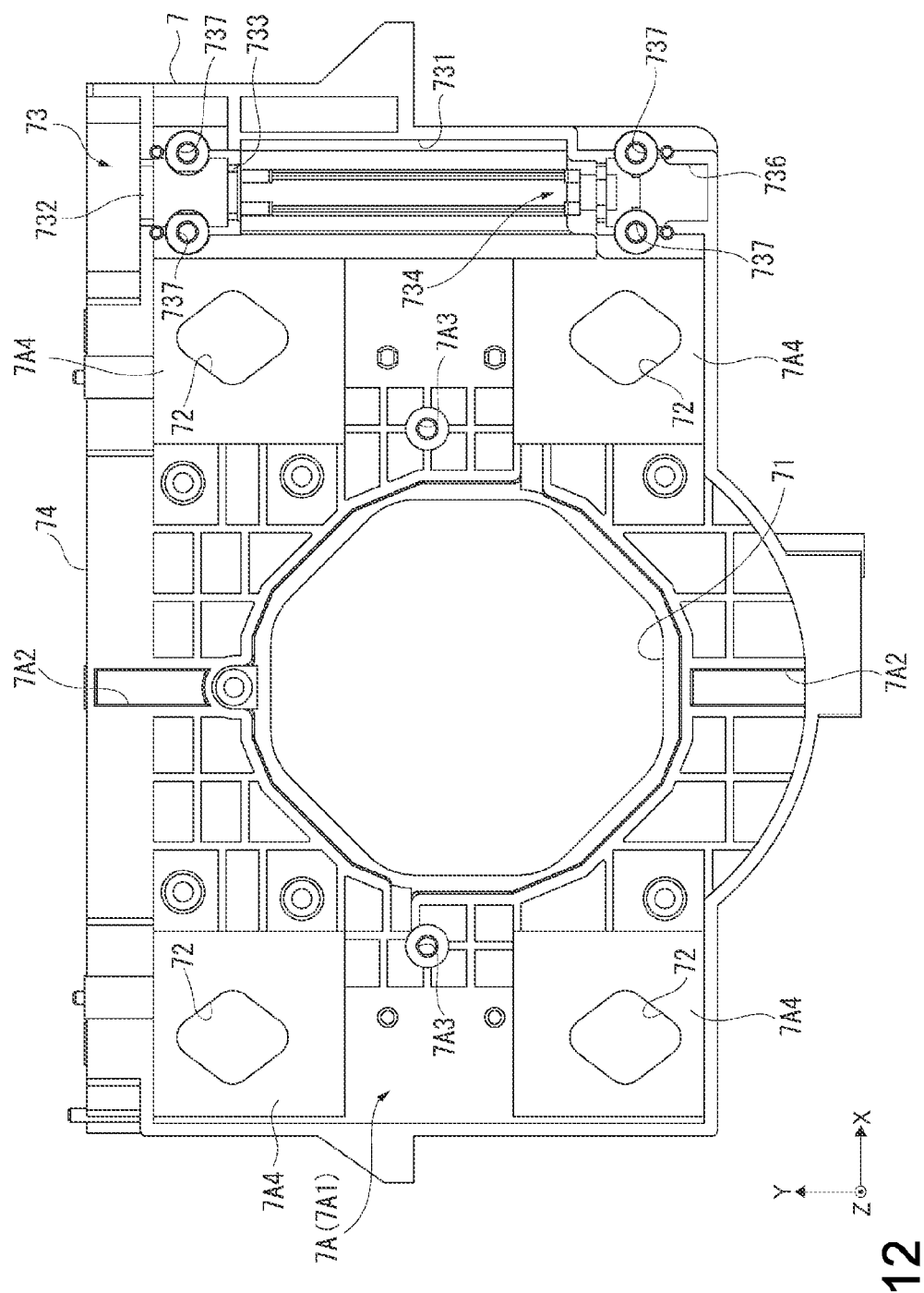
FIG. 12 shows a support member in the embodiment viewed from the light exiting side.

FIG. 12 shows the support member 7 viewed from the light exiting side (Z-direction side).

The support member 7 supports the members that form the projection position adjustment apparatus 4 and is fixed in the exterior enclosure 2 described above. Specifically, the support member 7, along with the linkage members CM, which will be described later, supports the first movable member 5, and the support member 7 and the first movable member 5 sandwich the second movable member 6.

The support member 7 has a substantially rectangular shape when viewed along the Z direction, and an insertion hole 71, through which the lens barrel 361 is inserted, is formed in a substantially central portion of the support member 7, as shown in FIG. 12.

An accommodation recess 7A1, which is recessed in the direction opposite to the Z direction, is formed in a Z-direction-side end surface 7A of the support member 7, and the first movable member 5 and the second movable member 6 described above are located in the accommodation recess 7A1. Openings 72, each of which has a substantially diamond shape and passes through the support member 7, are formed at the four corners of the accommodation recess 7A1. That is, the support member 7 has, around the insertion hole 71, two pairs of openings 72, and the openings 72 of each of the pairs sandwich the insertion hole 72. The screw pins CM2 of the linkage members CM, which will be described later, are inserted through the openings 72.

The guide grooves 7A2 are formed along the Y direction in the accommodation recess 7A1 and on opposite sides of the insertion hole 71 in the Y direction. The guide protrusions 61B1 described above are inserted into the guide grooves 7A2 when the second movable member 6 is placed in the accommodation recess 7A1. The guide protrusions and grooves guide movement of the second movable member 6 along the Y direction relative to the support member 7 but restrict movement of the second movable member 6 along the X direction relative to the support member 7.

The flat surface portions 7A4, each of which has a substantially rectangular shape, are formed around the openings 72 described above in the accommodation recess 7A1. The flat surface portions 51B2 described above come into contact with the flat surface portions 7A4 when the first movable member 5 is attached to the support member 7.

Threaded holes 7A3, into which the screws S2, which fix the washers W described above, are screwed, are formed in the accommodation recess 7A1 and on opposite sides of the insertion hole 71 in the X direction.

A placement portion 73 is provided in an end portion of the end surface 7A described above and on the X-direction side of the accommodation recess 7A1, and the second transmission unit 92 of the transmission apparatus 9, which will be described later, is placed in the placement portion 73. The placement portion 73 has a first accommodation portion 731 having a substantially rectangular shape elongated in the Y direction, a second accommodation portion 736 located on the side of the first accommodation portion 731 opposite to the Y direction, and threaded holes 737 formed in positions in the vicinity of the four corners of the placement portion 73.

The screw gear 921 (see FIGS. 17 and 18) in the second transmission unit 92, which will be described later, is placed in the first accommodation portion 731. The first accommodation portion 731 has a cutout 732 in a position in the first accommodation portion 731 and on the Y-direction side, that is, the side facing away from the second accommodation portion 736.

A restriction portion 733 is formed in the first accommodation portion 731 and protrudes toward the interior of the first accommodation portion 731. The restriction portion 733 is inserted into a recess 924 formed along the outer circumference of the screw gear 921, preventing the screw gear 921 from moving along the Y direction and falling off the first accommodation portion 731.

The first accommodation portion 731 has a communication port 734 at the end opposite to the Y direction, which allows the first accommodation portion 731 and the second accommodation portion 736 to communicate with each other. One end of the screw gear 921 is inserted into the communication port 734.

The second accommodation portion 736 is formed to be smaller than the first accommodation portion 731. An urging member BM, which urges the screw gear 921 toward the Y-direction side, and an intermediate member DM (see FIGS. 17 and 18) are placed in the second accommodation portion 736.

Screws S3 (see FIGS. 3 and 5) are screwed into the threaded holes 737 and attach a plate-shaped part PL, which presses the screw gear 921 to maintain the meshing state between a spiral groove 922 around the screw gear 921 and the engaging member 62, which is located between the screw gear 921 and the end surface 7A.

An attachment portion 74, to which the drive apparatus 8, which will be described later, is attached, is provided on the Y-direction-side end surface of the support member 7.

Figure 13:
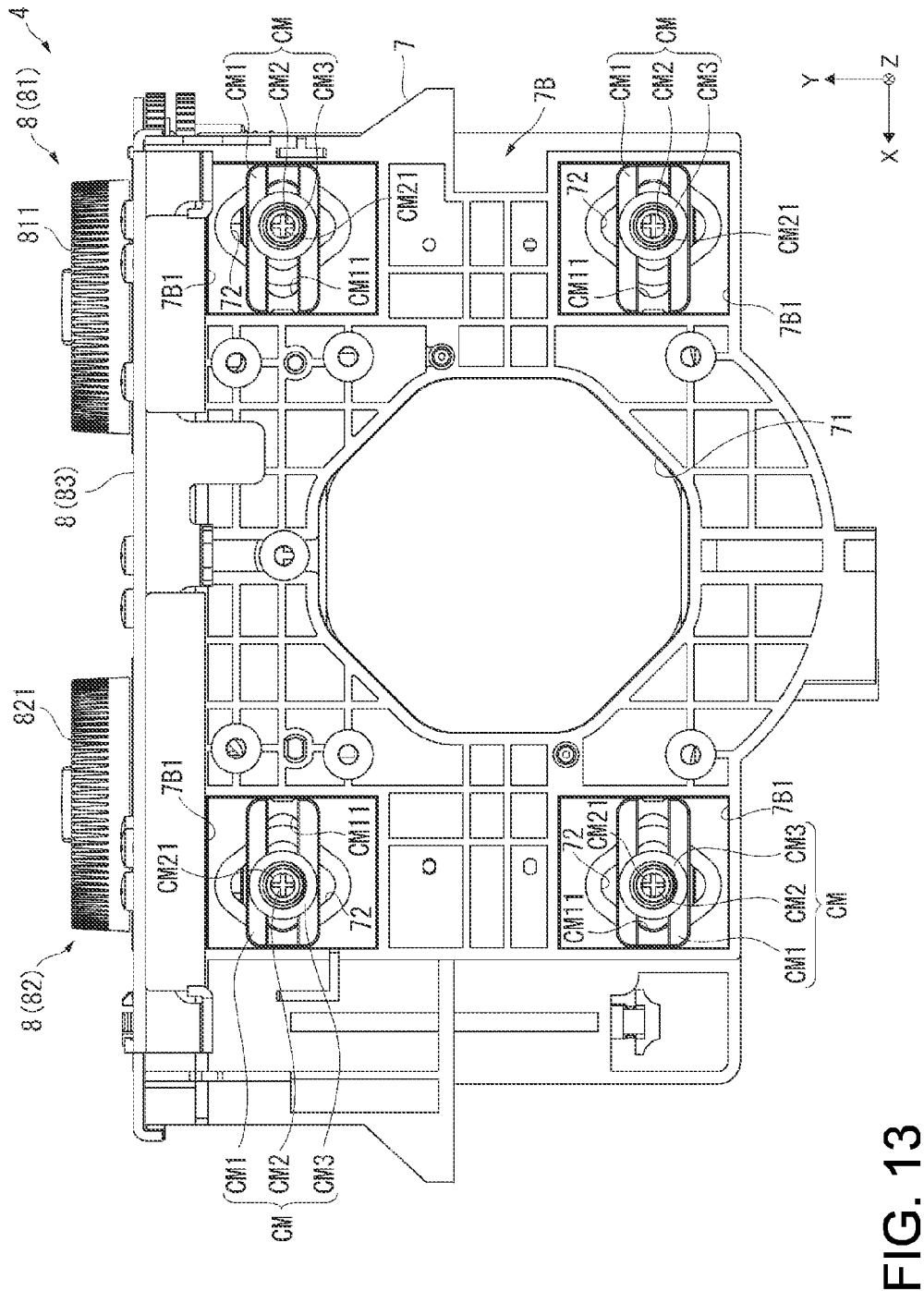
FIG. 13 shows the support member in the embodiment viewed from the light incident side.

FIG. 13 shows the support member 7 to which the drive apparatus 8 and the linkage member CM are attached and which is viewed from the light incident side (side opposite to the Z direction).

Recesses 7B1, each of which has a substantially rectangular shape and is recessed in the Z direction, are formed in an end surface 7B of the support member 7 on the side opposite to the Z direction and in positions corresponding to the four corners of the accommodation recess 7A1 described above, as shown in FIG. 13. In other words, the recesses 7B1 are formed in positions corresponding to the openings 72 described above, and the openings 72 are formed through the bottom surfaces of the recesses 7B1. The linkage members CM are placed in the recesses 7B1.

Configuration of Linkage Members

The linkage members CM slidably link the first movable member 5 to the support member 7 with the second movable member 6 placed between the support member 7 and the first movable member 5. The linkage members CM are formed of four linkage members provided in the projection position adjustment apparatus 4.

Each of the linkage members CM has a sandwiching member CM1, which is placed in the corresponding recess 7B1 of the support member 7 described above, and a screw pin CM2, and an urging member CM3, as shown in FIGS. 6 and 13.

The sandwiching members CM1 each have a substantially rectangular shape elongated in the X direction, are placed in the recesses 7B1 slidably along the Y direction, and sandwich, along with the first movable member 5, the support member 7, as shown in FIG. 13. The dimension of the sandwiching members CM1 in the X direction is set in accordance with the dimension of the recesses 7B1 in the same direction. That is, the dimension of the sandwiching members CM1 in the X direction is greater than the dimension of the openings 72 in the same direction. Each of the thus formed sandwiching members CM1 has an elongated hole CM11, which is elongated in the X direction, and the screw pin CM2 is inserted through the elongated hole CM11.

The screw pin CM2 is inserted along the Z direction through the elongated hole CM11 and the corresponding opening 72 and screwed into the corresponding hole 512 of the first movable member 5 described above. The first movable member 5 and the support member 7 are thus linked with each other with the second movable member 6 sandwiched therebetween.

The urging member CM3 is interposed between a head portion CM21 of the screw pin CM2 and the sandwiching member CM1 when the screw pin CM2 is inserted through the elongate hole CM11. The urging member CM3 is formed of a compression coil spring in the present embodiment and exerts an urging force in the direction in which the sandwiching member CM1 and the head portion CM21 separate from each other. That is, the urging force presses the sandwiching member CM1 against the support member 7. Further, since the urging force urges the head portion CM21 in the direction in which it separates from the support member 7, the first movable member 5, into which the screw pin CM2 is screwed, is pulled toward the support member 7, whereby the first movable member 5 presses the support member 7.

When the first movable member 5 moves along the X direction, the screw pins CM2 and the urging members CM3 move in the elongated holes CM11 described above along with the first movable member 5 in the same direction. On the other hand, when the second movable member 6 moves along the Y direction, the entire linkage members CM move in the recesses 7B1 along with the second movable member 6 in the same direction.

Configuration of Drive Apparatus

Figure 14:
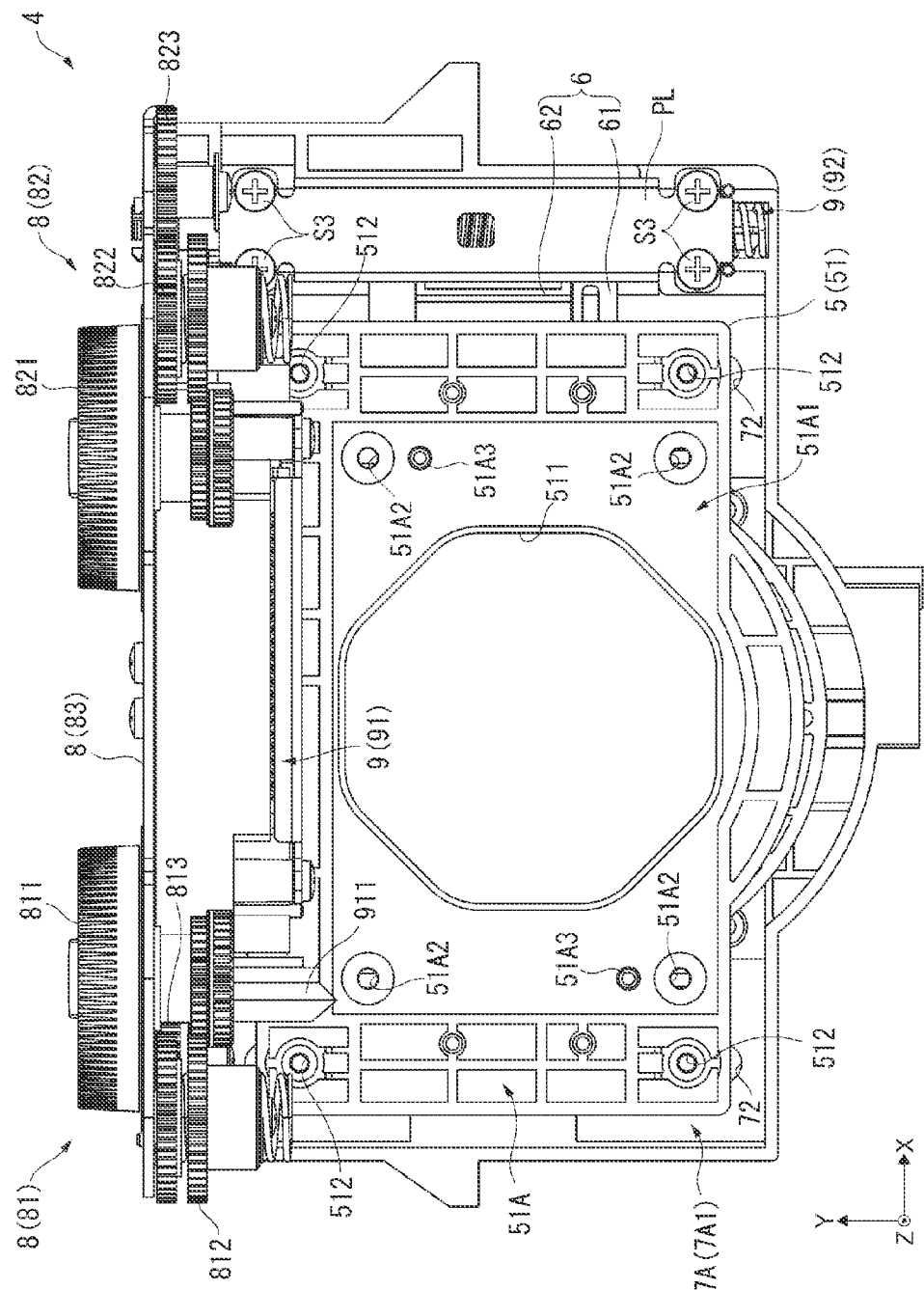
FIG. 14 shows the projection position adjustment apparatus in the embodiment viewed from the light exiting side.
Figure 15:
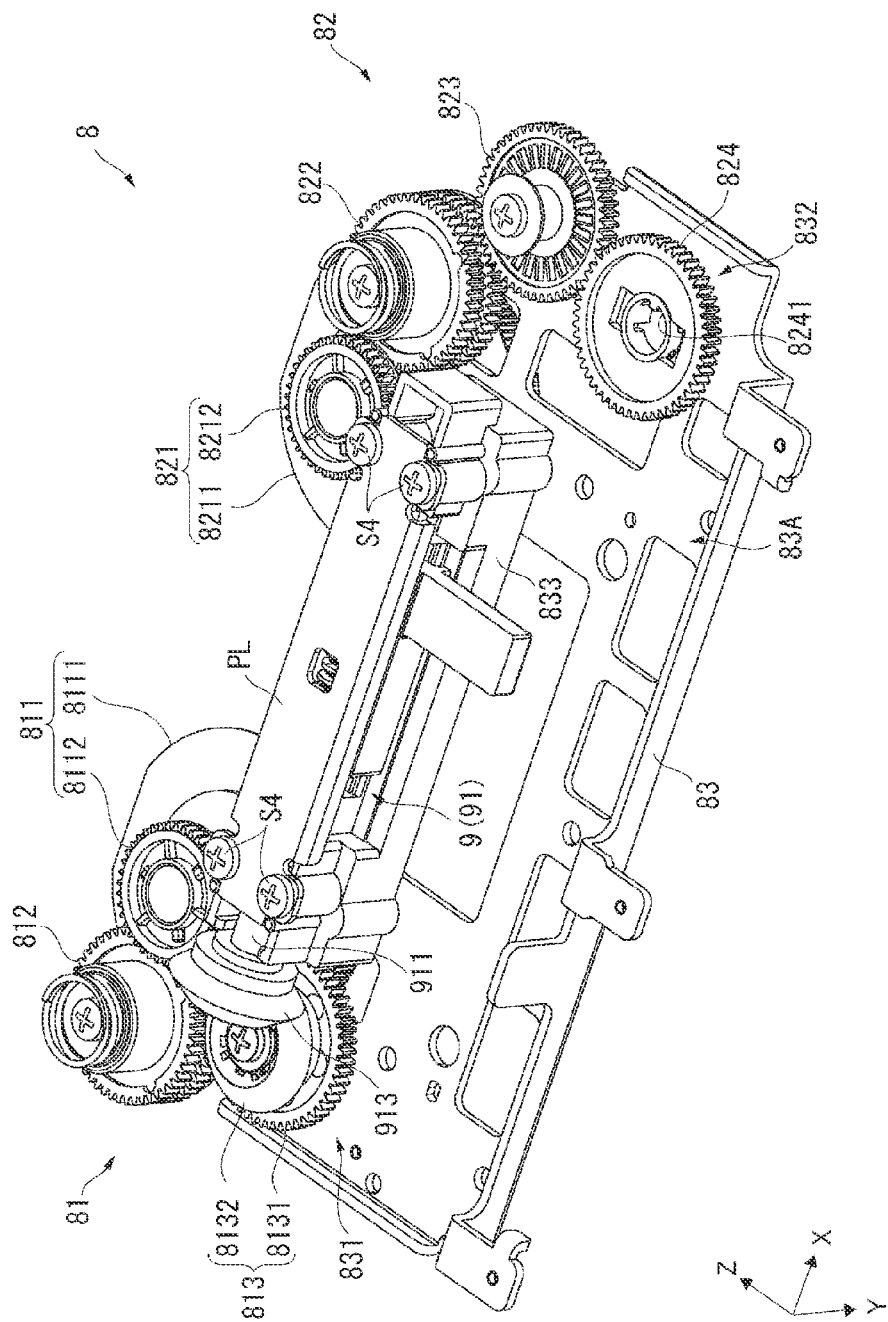
FIG. 15 is a perspective view of a drive apparatus in the embodiment.

FIG. 14 shows the projection position adjustment apparatus 4 viewed from the light exiting side without the connection portion 52 described above. FIG. 15 is a perspective view of the drive apparatus 8 viewed from the side opposite to the Y direction.

The drive apparatus 8 is attached to the attachment portion 74 described above and moves the first movable member 5 along the X direction and the second movable member 6 along the Y direction in accordance with user's operation, as shown in FIG. 14. Specifically, the drive apparatus 8 is so disposed when it is attached to the attachment portion 74 described above that part of the drive apparatus 8 overlaps with the end surface 7A described above when viewed along the Z direction.

The thus configured drive apparatus 8 includes a first drive unit 81, which moves the first movable member 5 along the X direction in response to user's operation, a second drive unit 82, which moves the second movable member 6 in the Y direction in response to user's operation, and an attachment member 83, to which the first drive unit 81 and the second drive unit 82 are attached, as shown in FIGS. 14 and 15.

The first drive unit 81 has a first dial 811, which corresponds to the operation section according to the embodiment of the invention, and gears 812 and 813 and transmits a rotational force produced when the user operates and rotates the first dial 811 to a first transmission unit 91 of the transmission apparatus 9, which will be described later.

The first dial 811 has a body portion 8111, which is exposed through the top portion 2A described above, and a gear portion 8112, which is provided coaxially with the body portion 8111.

Each of the gears 812 and 813 is formed of a two-tier gear, and the gear 812 meshes with the gear portion 812 described above and the gear 813. The gear 813 has a first gear portion 8131, which meshes with the gear 812, and a second gear portion 8132, which has a bevel-gear-like shape, and the second gear portion 8132 meshes with a screw gear 911, which forms the first transmission unit 91.

In the thus configured first drive unit 81, when the first dial 811 is rotated, the gears 812 and 813, which mesh with each other, rotate around axes along the Y direction, and the rotation causes the screw gear 911, which meshes with the gear 813, to rotate around an axis along the X direction.

The second drive unit 82 has a second dial 821 and gears 822 to 824 and transmits a rotational force produced when the user operates and rotates the second dial 821 to the second transmission unit 92 of the transmission apparatus 9, which will be described later.

The second dial 821 has a body portion 8211, which is exposed through the top portion 2A described above, and a gear portion 8212, which is provided coaxially with the body portion 8211, as the first dial 811 does.

The gear 822 is formed of a two-tier gear and meshes with the gear portion 8212 and the gear 823.

The gears 823 and 824 are each formed of a spur gear and mesh with each other. The gear 824 has an opening 8241 formed in a portion including the axis of rotation thereof, and a fitting portion 923 of the screw gear 921, which forms the second transmission unit 92, is fit into the opening 8241.

In the thus configured second drive unit 82, when the second dial 821 is rotated, the gears 822 to 824, which mesh with each other, rotate around axes along the Y direction, and the rotation causes the screw gear 921, which is fit into the gear 824, to rotate around an axis along the Y direction.

The attachment member 83, which corresponds to the plate-shaped member according to the embodiment of the invention, is formed by bending a metal plate-shaped part and attached to the attachment portion 74 described above. The attachment member 83 has a first support portion 831, a second support portion 832, and a placement portion 833.

The first support portion 831 supports the first dial 811 and the gears 812 and 813, which form the first drive unit 81, rotatably around axes along the Y direction. The first support portion 831 is provided on the Z-direction side of the attachment member 83 and in a position on the side opposite to the X direction.

The second support portion 832 supports the second dial 821 and the gears 822 to 824, which form the second drive unit 82, rotatably around axes along the Y direction. The second support portion 832 is provided on the Z-direction side of the attachment member 83 and in a position on the X-direction side.

Figure 16:
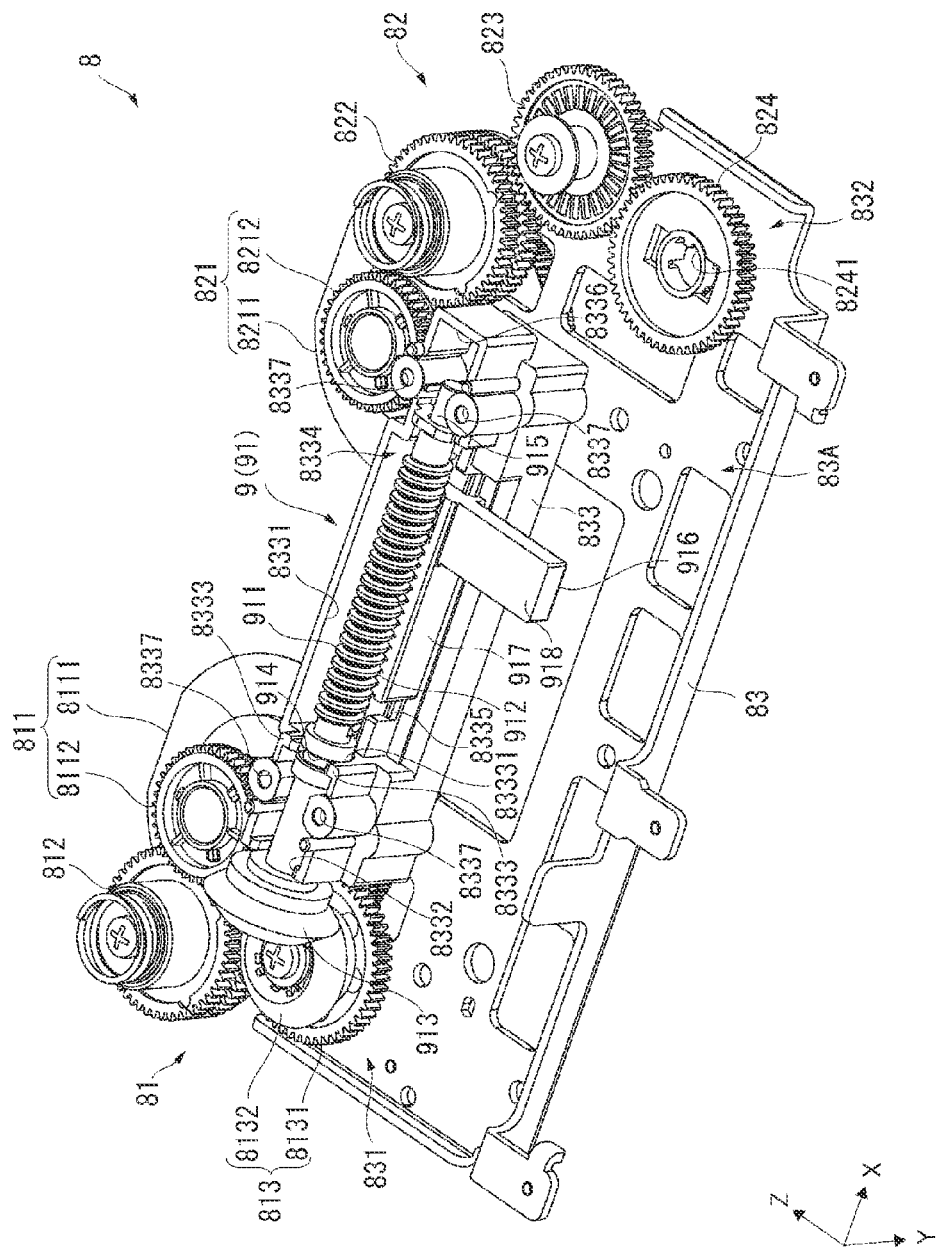
FIG. 16 is a perspective view showing the drive apparatus and a first transmission unit of a transmission apparatus in the embodiment.

FIG. 16 is a perspective view showing the drive apparatus 8 with the plate-shaped part PL removed from the state shown in FIG. 15.

The placement portion 833 accommodates the first transmission unit 91, which will be described later. The placement portion 833 is provided on an end surface 83A of the attachment member 83 on the side opposite to the Y direction, as shown in FIG. 16. In detail, the placement portion 833 is provided in a Z-direction-side portion of the end surface 83A and in a position sandwiched between the first support portion 831 and the second support portion 832 described above. The thus provided placement portion 833 has a first accommodation portion 8331 having a substantially rectangular shape elongated in the X direction, a second accommodation portion 8336 located on the X-direction side of the first accommodation portion 8331, and threaded holes 8337 provided in positions in the vicinity of the four corners of the placement portion 833.

The screw gear 911, which forms the first transmission unit 91, is placed in the first accommodation portion 8331. The first accommodation portion 8331 has a cutout 8332 in a position in the first accommodation portion 8331 and on the side opposite to the X direction, that is, the side facing away from the second accommodation portion 8336.

The first accommodation portion 8331 further has a restriction portion 8333, which protrudes toward the interior of the first accommodation portion 8331. The restriction portion 8333 is inserted into a recess 914 formed along the outer circumference of the screw gear 911, preventing the screw gear 911 from moving along the X direction and falling off the first accommodation portion 8331.

The first accommodation portion 8331 further has a communication port 8334 at the X-direction-side end, which allows the first accommodation portion 8331 and the second accommodation portion 8336 to communicate with each other. One end of the screw gear 911 is inserted into the communication port 8334.

The first accommodation portion 8331 further has a concavely cut cutout 8335, which is located on the side opposite to the Z direction and in a substantially central portion in the X direction. A guide rail which is not shown but into which the slidable member 916, which will be described later, is fit is formed at the bottom of the cutout 8335. The guide rail guides movement of the slidable member 916 along the X direction.

The second accommodation portion 8336 is formed to be smaller than the first accommodation portion 8331. An urging member BM, which urges the screw gear 911 in the direction opposite to the X direction, and an intermediate member DM are placed in the second accommodation portion 8336.

Screws S4 (see FIG. 15), which attach a plate-shaped part PL, which presses the screw gear 911, are screwed into threaded holes 8337.

Configuration of Transmission Apparatus

The transmission apparatus 9 receives the rotational force produced and transmitted from the drive apparatus 8 and has a function of moving the first movable member 5 and the second movable member 6. The transmission apparatus 9 includes the first transmission unit 91, which engages with the first drive unit 81 and moves the first movable member 5 along the X direction in response to user's operation of rotating the first dial 811 described above, and the second transmission unit 92, which engages with the second drive unit 82 described above and moves the second movable member 6 along the Y direction in response to user's operation of rotating the second dial 821 described above, as shown in FIG. 14.

Configuration of First Transmission Unit

Figure 18:
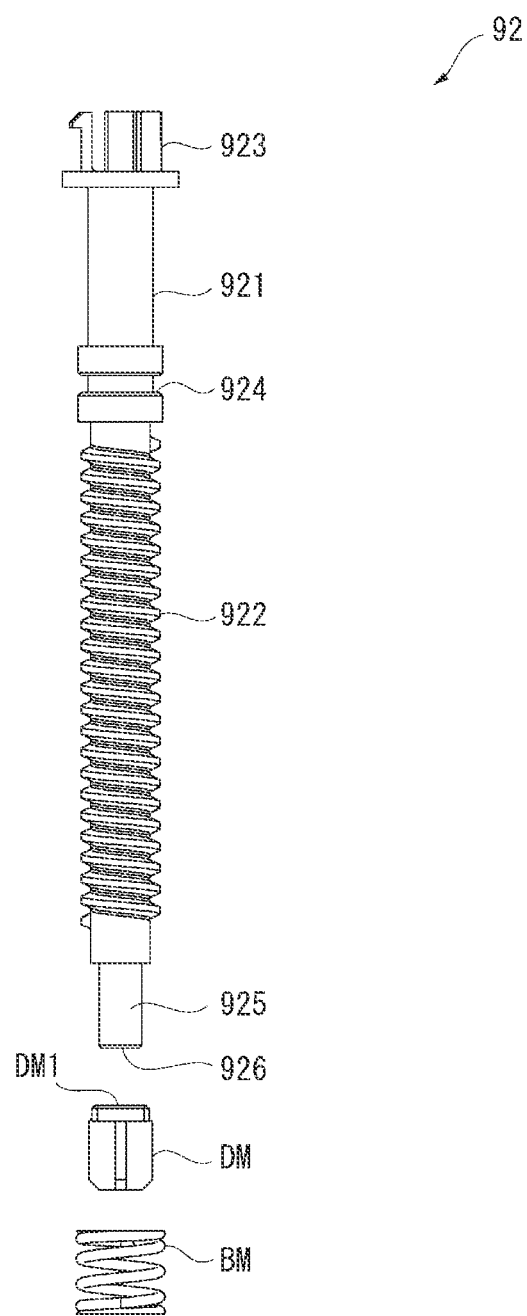
FIG. 18 is a plan view showing the second transmission unit of the transmission apparatus in the embodiment.

The first transmission unit 91 corresponds to the drive mechanism according to the embodiment of the invention and includes not only the screw gear 911 and the slidable member 916, which are accommodated in the placement portion 833 described above as shown in FIG. 16, but also the urging member BM and the intermediate member DM although not shown in FIG. 16 (both see FIG. 18).

Among them, the urging member BM and the intermediate member DM are accommodated in the second accommodation portion 8336 and urge the screw gear 911 in the direction opposite to the X direction, as described above. The urging member BM and the intermediate member DM have the same configurations of the urging member BM and the intermediate member DM that form the second drive unit 82, which will be described later in detail.

The screw gear 911 is so accommodated in the first accommodation portion 8331 described above that the thrust direction of the screw gear 911 extends along the X direction. The screw gear 911 has a spiral groove 912, a bevel gear 913, the recess 914, and a small-diameter portion 915.

The spiral groove 912 is formed along the outer circumferential surface of the screw gear 911 and in a substantially central portion in the thrust direction thereof.

The bevel gear 913 is attached to an end of the screw gear 911 located on the side opposite to the X direction and exposed through the cutout 8332 out of the first accommodation portion 8331. The bevel gear 913 meshes with the second gear portion 8132 of the gear 813 described above.

The recess 914 is formed between the spiral groove 912 and the bevel gear 913. The recess 914 is so formed that it extends along the circumferential direction of the screw gear 911 and is recessed inward in the radial direction thereof. The restriction portion 8333 described above is inserted into the recess 914.

The small-diameter portion 915 is formed at the end on the side facing away from the bevel gear 913 described above, and the diameter of the small-diameter portion 915 is smaller than the diameter of a central portion of the screw gear 911. The small-diameter portion 915 is inserted into the communication port 8334 described above and comes into contact with the intermediate member DM (not shown) in the second accommodation portion 8336.

The slidable member 916 is formed in a substantially L-like shape having a meshing portion 917 along the X direction and an extending portion 918 along the Z direction.

The meshing portion 917 meshes with the spiral groove 912 around the screw gear 911 and, although not shown, fits into the guide rail formed in the cutout 8335 described above.

The extending portion 918 linearly extends from the X-direction-side end of the meshing portion 917 in the direction opposite to the Z direction and is inserted into the above mentioned recess 513 of the first movable member 5, which is linked to the support member 7 via the linkage members CM described above. The dimension of the extending portion 918 in the X direction is substantially equal to the inner dimension of the recess 513 in the same direction.

The slidable member 916 is pressed by the plate-shaped part PL (see FIG. 15), which is fixed with the screws S4 screwed into the threaded holes 8337 described above. Therefore, when the screw gear 911 is rotated, rotation of the slidable member 916 around the same axis around which the screw gear 911 rotates is restricted.

In the thus configured first transmission unit 91, when the user operates and rotates the first dial 811 in the first drive unit 81 so that the screw gear 911 is rotated around an axis along the X direction, the slidable member 916, which meshes with the spiral groove 912 around the screw gear 911, moves along the X direction. As a result, the first movable member 5, which has the recess 513 into which the extending portion 918 is inserted, moves along the X direction.

Further, as indicated by the fact that the extending portion 918, which extends from the meshing portion 917 in the direction opposite to the Z direction, is inserted into the recess 513 of the first movable member 5, the first transmission unit 91 is so disposed that it overlaps with the first movable member 5 on the Z-direction side when viewed along the Z direction, as shown in FIG. 14.

Configuration of Second Transmission Unit

Figure 17:
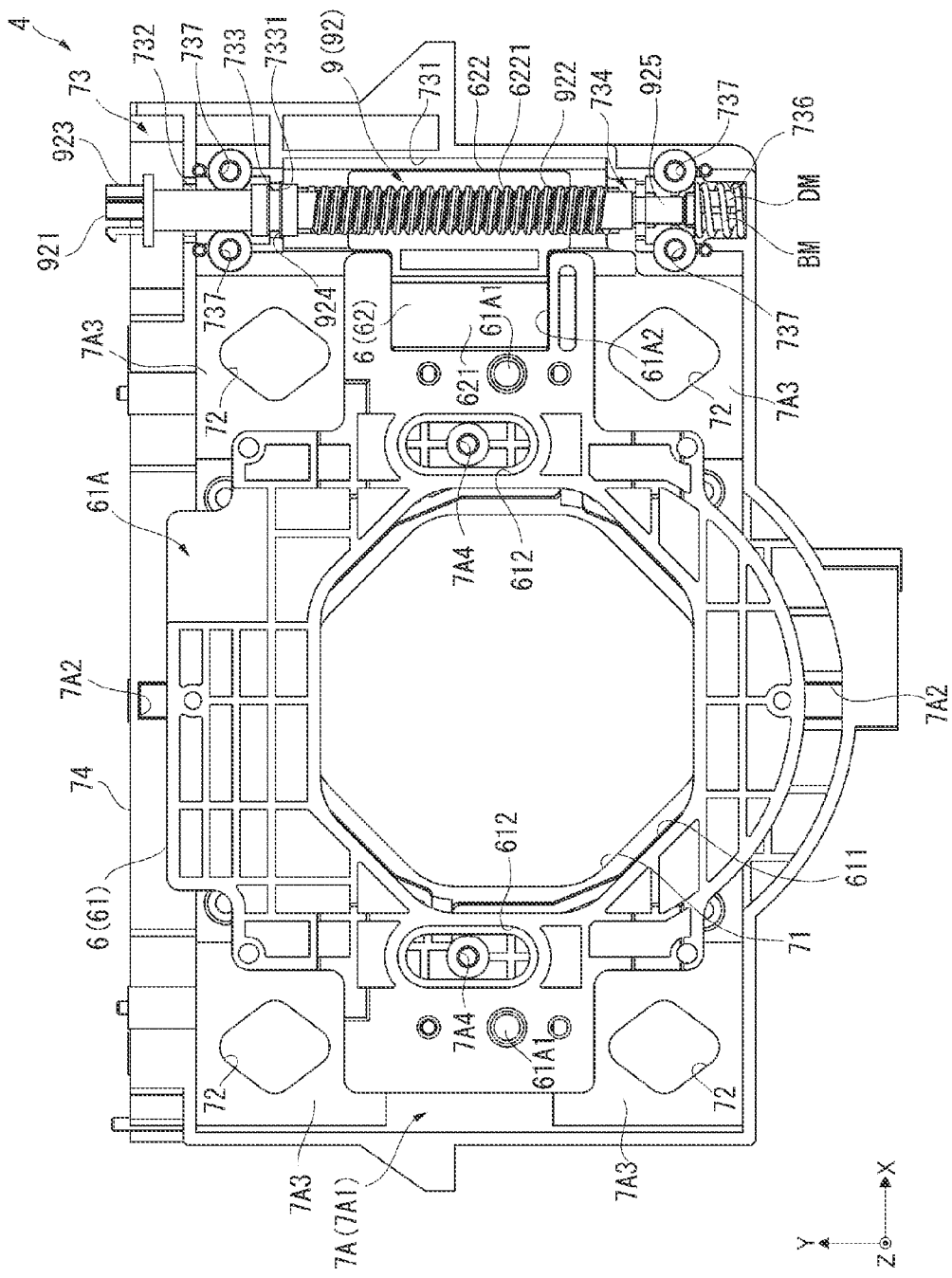
FIG. 17 shows the support member and a second transmission unit of the transmission apparatus in the embodiment viewed from the light exiting side.

FIG. 17 shows the support member 7 to which the second transmission unit 92 is attached and the second movable member 6 viewed from the light exiting side (Z-direction side). FIG. 18 is a plan view showing the second transmission unit 92.

The second transmission unit 92 receives the rotational force produced by the second drive unit 82 and has a function of moving the second movable member 6 described above in the Y direction. The second transmission unit 92 includes the screw gear 921, the urging member BM, and the intermediate member DM, as shown in FIGS. 17 and 18.

The screw gear 921 has the spiral groove 922, the fitting portion 923, the recess 924, and a small-diameter portion 925.

The spiral groove 922 is formed along the outer circumferential surface of the screw gear 921 and in a substantially central portion in the thrust direction thereof, and the spiral groove 922 meshes with the meshing portion 6221 of the engaging member 62 described above.

The fitting portion 923 is located on one end side of the screw gear 921 in the thrust direction thereof and inserted and fit into the opening 8241 of the gear 824 described above. As a result, the screw gear 921 rotates coaxially with the gear 824 described above around an axis along the thrust direction.

The recess 924 is located between the spiral groove 922 and the fitting portion 923. The recess 924 is so formed that it extends along the circumferential direction of the screw gear 921 and is recessed inward in the radial direction thereof. The restriction portion 733 described above is inserted into the recess 924.

The small-diameter portion 925 is formed at the end on the side facing away from the fitting portion 923, and the diameter of the small-diameter portion 925 is smaller than the diameter of a central portion of the screw gear 921. The small-diameter portion 925 is inserted into the communication port 734 described above and comes into contact with the intermediate member DM in the second accommodation portion 736.

The urging member BM produces an urging force that urges the screw gear 921 toward one side thereof in the thrust direction, that is, toward the fitting portion 923. The urging member BM is formed of a compression coil spring in the present embodiment. The same holds true for the urging member BM that forms the first transmission unit 91 described above.

The intermediate member DM has a contact surface DM1, which comes into contact with an end surface 926 of the screw gear 921 on the side where the small-diameter portion 925 is present. The intermediate member DM not only functions as a holder that holds the urging member BM but also is pressed by the urging force of the urging member BM to urge the screw gear 921 in contact with the contact surface DM1 toward the side where the fitting portion 923 described above is present.

Position of Projection Position Adjustment Apparatus

Figure 19:
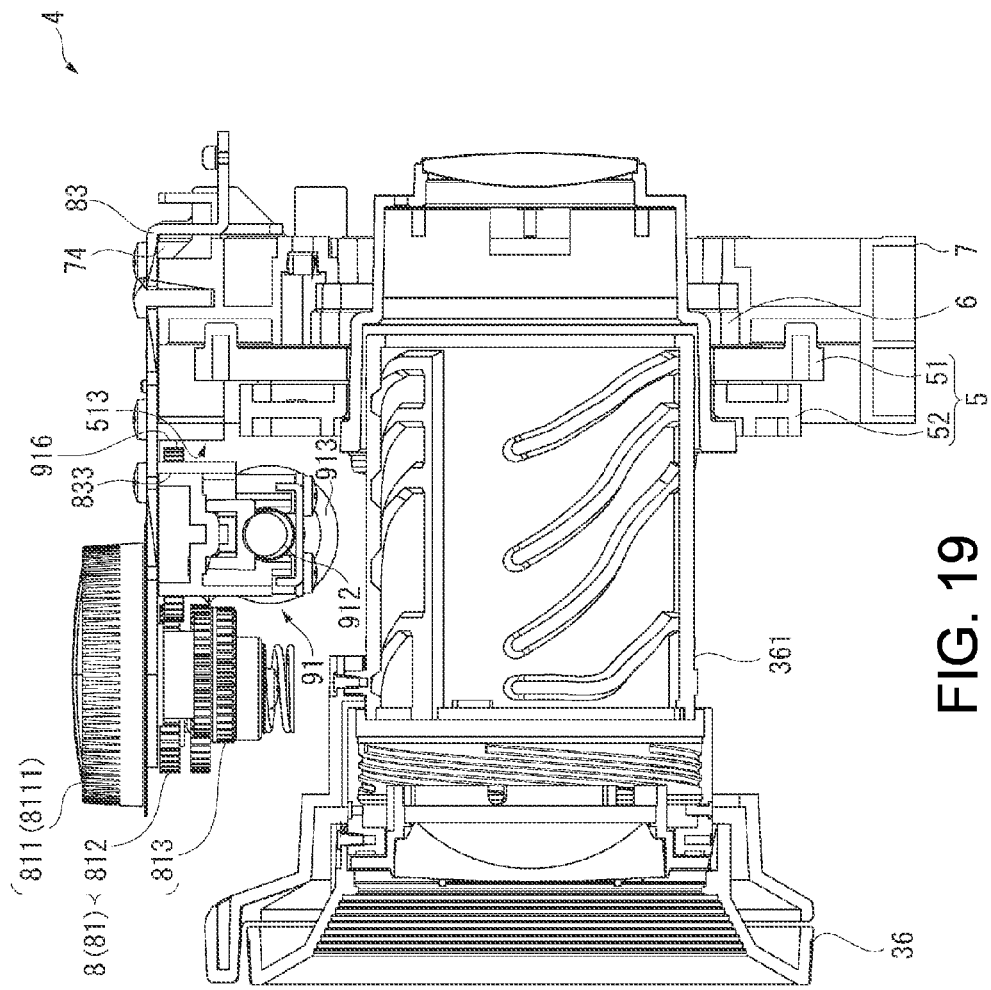
FIG. 19 is a cross-sectional view of the projection position adjustment apparatus in the embodiment.

FIG. 19 is a cross-sectional view of the projection position adjustment apparatus 4 taken along a plane including the Z direction and viewed in the X direction.

The first transmission unit 91, which corresponds to the drive mechanism according to the embodiment of the invention, is so disposed that it overlaps with part of the first movable member 5 when viewed along the central axis of the projection optical apparatus 36 (viewed from Z-direction side). That is, the first transmission unit 91 is provided in a position on the opposite side of the first movable member 5 to the support member 7, as shown in FIG. 19. Further, the body portion 8111 of the first dial 811 and the body portion 8211 of the second dial 821 are rotatably supported by the Y-direction side surface of the attachment member 83, which corresponds to a plate-shape member according to the embodiment of the invention, and the gears 812, 813, 822, 823, and 824 are rotatably supported by the other end surface 83A of the attachment member 83. The end surface 83A is then attached to the attachment portion 74, which is the Y-direction-side side surface of the support member 7.

Further, the placement portion 833 as well as the screw gear 911 and the slidable member 916, which form the first transmission unit 91, are attached to the end surface 83A of the attachment member 83. Since the placement portion 833 is provided in a position facing the recess 513 of the first movable member 5, the linearly extending portion 918 of the slidable member 916 is inserted into the recess 513. As a result, the first movable member 5 moves in the X direction and the direction opposite to the X direction when the slidable member 916 moves.

The gears 812 and 813, the placement portion 833, and the first transmission unit 91 (screw gear 911 and slidable member 916) are thus disposed in a space on the Y-direction side of the lens barrel 361 in the projection optical apparatus 36.

Operation of Projection Position Adjustment Apparatus

The thus configured projection position adjustment apparatus 4 operates as follows.

For example, as shown in FIG. 5, when the user operates and rotates the first dial 811 in one direction, the gears 812 and 813 are rotated, and the screw gear 911, which meshes with the gear 813, is rotated around an axis along the thrust direction (X direction) of the screw gear 911. The rotation of the screw gear 911 moves the slidable member 916, which meshes with the screw gear 911, in the X direction. Since the slidable member 916 is inserted into the recess 513 of the first movable member 5, the first movable member 5 is moved relative to the second movable member 6 and the support member 7 in response to the movement of the slidable member 916 in the same direction in which the slidable member 916 is moved. As a result, the projection optical apparatus 36 held by the first movable member 5 is moved in the X direction.

On the other hand, when the user operates and rotates the first dial 811 in the other direction, the screw gear 911 is rotated in the opposite direction via the gears 812 and 813, and the slidable member 916 and hence the first movable member 5 are moved in the direction opposite to the X direction.

As a result, the position where the projection optical apparatus 36 projects an image is adjusted in the X direction (first direction).

Further, when the user operates and rotates the second dial 821 in one direction, the gears 822 to 824 are rotated, and the screw gear 921, which is fit into the gear 824, is rotated around an axis along the thrust direction (Y direction) of the screw gear 921. The rotation of the screw gear 921 moves the second movable member 6, which has the engaging member 62 that meshes with the screw gear 921, in the Y direction. Since the guide protrusions of the second movable member 6 are inserted into the above-mentioned guide recesses 51B1 of the first movable member 5, the first movable member 5 is also caused, in response to the movement of the second movable member 6 in the Y direction, to slide in the same direction. As a result, the projection optical apparatus 36 held by the first movable member 5 is moved in the Y direction.

On the other hand, when the user operates and rotates the second dial 821 in the other direction, the screw gear 921 is rotated in the opposite direction via the gears 822 to 824, and the second movable member 6 and hence the first movable member 5 are moved in the direction opposite to the Y direction.

As a result, the position where the projection optical apparatus 36 projects an image is adjusted in the Y direction (second direction).

Advantageous Effects Provided by Embodiment

The projector 1 according to the present embodiment described above provides the following advantageous effects.

The first transmission unit 91, which moves the first movable member 5 in the orthogonal direction orthogonal to the central axis of the projection optical apparatus 36, is located in a position where the first transmission unit 91 overlaps with the first movable member 5 when viewed along the central axis of the projection optical apparatus 36. Therefore, since the first transmission unit 91 is not located on the side facing a side surface of the first movable member 5, that is, outside the first movable member 5 away from the projection optical apparatus 36 when viewed along the central axis described above, the dimension of the projection position adjustment apparatus 4 along the radial direction of the projection optical apparatus 36 can be reduced. As a result, the size of the projection position adjustment apparatus 4 and hence the size of the projector 1 can be reduced.

Further, since the first transmission unit 91 is located on the opposite side of the projection position adjustment apparatus 4 to the support member 7, and the distance between the first movable member 5 and the first transmission unit 91 is therefore shortened, the first movable member 5 and the first transmission unit 91 are allowed to engage with each other with precision, and the first movable member 5 can therefore be moved with precision.

Moreover, since the projection optical apparatus 36 (lens barrel 361 in projection optical apparatus 36) is held by the first movable member 5, the projection optical apparatus 36 is smaller than the first movable member 5. Therefore, when the projection position adjustment apparatus 4 is viewed along the central axis described above, a space is created between the outer edge of the first movable member 5 and the outer edge of the projection optical apparatus 36.

In this situation, since the first transmission unit 91 can be disposed in the space in the present embodiment, a space in which the first transmission unit 91 is disposed does not need to be provided outside the first movable member 5, whereby the size of the projection position adjustment apparatus 4 can be definitely reduced. The size of the projector 1 can therefore be reduced.

The first movable member 5, which holds the projection optical apparatus 36 and moves in the horizontal direction (X direction and direction opposite to X direction), is moved by the second movable member 6, which moves in the vertical direction (Y direction and direction opposite to Y direction), in the horizontal direction described above. The projection optical apparatus 36 can thus be moved both in the horizontal and vertical directions described above. The range over which the projection optical apparatus 36 moves can therefore be increased.

Further, the first movable member 5 is located in a position shifted from the second movable member 6 toward the side where the image is projected. Since the first transmission unit 91 is located in a position shifted from the position where the first movable member 5 holds the projection optical apparatus 36 toward the side where the image is projected, the first transmission unit 91 can be reliably disposed in the space described above. The size of the projector 1 can therefore be definitely reduced.

Further, since the first transmission unit 91 has a simple configuration formed of the screw gear 911 and the slidable member 916, the first movable member 5 can be reliably moved in the horizontal direction (X and direction opposite to X direction).

Since the first dial 811, which the user operates and rotates to move the first transmission unit 91, and the gears 812 and 813, which transmit the rotational force produced by the dial 811 to the first transmission unit 91, and the attachment member 83, which rotatably supports the first dial 811 on the Y-direction-side surface of the attachment member 83, rotatably supports the gears 812 and 813 on the end surface 83A, which is the surface of the attachment member 83 on the side opposite to the Y direction, and is attached to the support member 7 are provided, and the first transmission unit 91 is disposed on the end surface 83A, the rotational force produced by the operated and rotated first dial 811 is transmitted via the gears 812 and 813 to the first transmission unit 91, and the first transmission unit 91 moves the first movable member 5. As a result, the first movable member 5 and hence the projection optical apparatus 36 can be moved only by rotating the first dial 811.

Further, the gears 812 and 813 are supported by the attachment member 83, and the first transmission unit 91 is disposed on the end surface 83A of the attachment member 83, which is attached to the support member 7. The transmission unit 91 can therefore be reliably disposed in a position where it overlaps with part of the first movable member 5 when the projection position adjustment apparatus 4 is viewed along the central axis described above.

In addition, since the first dial 811 is rotatably supported by the surface of the attachment member 83 that faces away from the end surface 83A, the first dial 811 can be readily operated and rotated.

Further, the slidable member 916 is provided with the extending portion 918, which linearly extends toward the recess 513 of the first movable member 5, and the extending portion 918 engages with the recess 513, which is provided through the Z-direction side surfaces of the first movable member 5. That is, in the present embodiment, since the first movable member 5 is moved by the slidable member 916, which is provided in a position where it overlaps with the first movable member 5, the first movable member 5 can be more reliably moved than in a case where the slidable member 916 is provided on the side facing a side surface of the first movable member 5. Further, since the first transmission unit 91 is provided on the attachment member 83, which is made of a metal having high strength, the attachment member 83 will not bend or come into contact with the projection optical apparatus 36 when the first transmission unit 91 and the gears 812 and 813 are provided on the end surface 83A of the attachment member 83.

Variations of Embodiment

The invention is not limited to the embodiment described above, and changes, improvements, and other modifications to the extent that they achieve the advantage of the invention fall within the scope of the invention.

In the embodiment described above, the transmission apparatus 9 is disposed on the support member 7, but the invention is not necessarily configured this way. For example, the transmission apparatus 9 may instead be disposed on one of the movable members 5 and 6.

In the embodiment described above, the first transmission unit 91 is provided on the light exiting side, that is, in a position on the Z-direction side where the first transmission unit 91 overlaps with the first movable member 5, but the invention is not necessarily configured this way. For example, the first transmission unit 91 may instead be provided in a position on the side opposite to the Z direction, that is, in a position on the side facing the support member 7 where the first transmission unit 91 overlaps with the first movable member 5.

In the embodiment described above, the first movable member 5 and the second movable member 6 are members separate from each other, but the invention is not necessarily configured this way. In this case, a movable member that moves in the horizontal direction (X direction and direction opposite to X direction) and the vertical direction (Y direction and direction opposite to Y direction) only needs to be employed.

In the embodiment described above, the first transmission unit 91 includes the screw gear 911 and the slidable member 916, but the invention is not necessarily configured this way. For example, any configuration in which the rotational force produced by the first dial 811 can be transmitted to the first movable member 5 may be employed.

Further, in the embodiment described above, the drive apparatus 8 includes the dials 811 and 821 operated by the user, but the invention is not necessarily configured this way. For example, the drive apparatus 8 may instead include a motor or any other rotational force generator.

In the embodiment described above, the body portions 8111 and 8211 of the dials 811 and 821 are provided on the Y-direction-side surface of the attachment member 83, but the invention is not necessarily configured this way. For example, the body portions 8111 and 8211 described above may be supported by the end surface 83A of the attachment member 83, and the body portions 8111 and 8211 of the dials 811 and 821 may be exposed through the openings 2A1 and 2A2 formed through the top portion 2A.

In the embodiment described above, the first transmission unit 91 is provided on the end surface 83A of the attachment member 83, but the invention is not necessarily configured this way. For example, the second transmission unit 92 may also be provided on the end surface 83A of the attachment member 83. In this case, the dimension of the projection position adjustment apparatus 4 in the width direction can be reduced by the size of the space in which the second transmission unit 92 is provided.

Further, in the embodiment described above, the first transmission unit 91 is disposed on the side facing away from the support member 7, that is, on the side facing the first movable member 5, but the invention is not necessarily configured this way. For example, the first transmission unit 91 may instead be disposed on the side facing the support member (side opposite to Z direction).

In the embodiment described above, the second movable member 6 is formed of the body portion 61 and the engaging member 62, but the invention is not necessarily configured this way. For example, the second movable member 6 may instead be an integrated member. In this case, the second movable member 6 only needs to be formed with higher precision. As a result, the rigidity of the second movable member can be increased.

In the embodiment described above, the projector 1 includes the three liquid crystal panels 353R, 353G, and 353B, but the invention is not necessarily configured this way. That is, the invention is also applicable to a projector using two or a smaller number of liquid crystal panels 353 or four or a greater number of liquid crystal panels 353.

In the embodiment described above, each of the liquid crystal panels 353 is a transmissive type in which the light incident surface and the light exiting surface are separately provided, and a reflective liquid crystal panel in which a single surface serves both as the light incident surface and the light exiting surface may be used. Further, a light modulation apparatus that is not based on a liquid crystal material, such as a micromirror display device or any other light modulation apparatus capable of modulating an incident light flux to form an image according to image information, may be used.

In the embodiment described above, the light source apparatus 31 includes the light source lamp 311 and the reflector 312, which reflects the light emitted from the light source lamp 311, but the invention is not necessarily configured this way. That is, the light source apparatus may have a configuration including an LED (light emitting diode) or any other solid-state light source. Further, the number of light source apparatus may be two or greater.

The above embodiment has been described with reference to the configuration in which the optical unit 3 has a substantially L-like shape in a plan view, but the invention is not necessarily configured this way. For example, the optical unit 3 may instead have a configuration having a substantially U-like shape in a plan view.

CROSS REFERENCE TO RELATED APPLICATIONS

This application claims priority to Japanese Patent Application No. 2014-058774 filed on Mar. 20, 2014, the entire contents of which are incorporated by reference herein.

What is claimed is:

1. A projector comprising:
a projection optical apparatus that projects an image; and
a movement apparatus that moves the projection optical apparatus in orthogonal directions orthogonal to a central axis of the projection optical apparatus,
wherein the movement apparatus includes:
  a first movable member that holds the projection optical apparatus and moves in a first orthogonal direction of the orthogonal directions,
  a support member that supports the movable member movably in the orthogonal directions, and
  a second movable member that is disposed between the first movable member and the support member and moves along with the first movable member in a second orthogonal direction of the orthogonal directions, wherein the second orthogonal direction is orthogonal to the first direction,
a first drive mechanism that includes:
  a first screw gear having a first spiral groove formed on an outer circumference thereof and rotating around an axis along the first direction; and
  a first slidable member that meshes with the first screw gear and moves in the first direction, and the first slidable member moves the first movable member in the first direction;
a second drive mechanism that includes:
  a second screw gear having a second spiral groove formed on an outer circumference thereof and rotating around an axis along the second direction; and
  a second slidable member that meshes with the second screw gear and moves in the second direction, and the second slidable member moves the second movable member in the second direction; and
a first plate-shaped member that protrudes a direction in which a light incident on the projection optical apparatus travels, and is attached to the support member,
wherein the first drive mechanism and the second drive mechanism are disposed in a position where the first drive mechanism and the second drive mechanism overlap with part of the first movable member or the second movable member when the movement apparatus is viewed along the central axis of the projection optical apparatus, and
wherein the first drive mechanism is disposed between the projection optical apparatus and the plate-shaped member.

2. The projector according to claim 1,
wherein
the first drive mechanism is located in a position shifted from the position where the first movable member holds the projection optical apparatus toward the side where the projection optical apparatus projects the image.

3. The projector according to claim 2,
wherein
the first slidable member is located in a position shifted from the first movable member toward the side where the image is projected and moves the first movable member when the first slidable member moves.

4. The projector according to claim 1, further comprising:
an operation portion on which rotating operation that moves the drive mechanism is performed;
at least one gear that transmits a rotational force produced by the operation portion to the drive mechanism; and
a second plate-shaped member that has one surface that rotatably supports the operation portion, and has another surface that rotatably supports the at least one gear.

* * * * *